US012635036B2

(12) United States Patent
Antonyraj et al.

(10) Patent No.: US 12,635,036 B2
(45) Date of Patent: May 19, 2026

(54) COORDINATED INACTIVITY TIMER INFORMATION ELEMENT (IE) FOR DUAL CONNECTIVITY

(71) Applicant: RAKUTEN SYMPHONY, INC., Tokyo (JP)

(72) Inventors: Santhiyaku Jeevakumar Antonyraj, Bangalore (IN); Gugan Ilangovan, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 440 days.

(21) Appl. No.: 18/180,847

(22) Filed: Mar. 9, 2023

(65) Prior Publication Data

US 2024/0306250 A1     Sep. 12, 2024

(51) Int. Cl.
H04W 76/34      (2018.01)
H04W 28/02      (2009.01)
H04W 76/15      (2018.01)

(52) U.S. Cl.
CPC ....... H04W 76/34 (2018.02); H04W 28/0284 (2013.01); H04W 76/15 (2018.02)

(58) Field of Classification Search
CPC ................................................... H04W 76/34
See application file for complete search history.

(56) References Cited

U.S. PATENT DOCUMENTS

| | | | | |
|---|---|---|---|---|
| 10,206,226 B2 * | 2/2019 | Jha | ....................... | H04B 7/2621 |
| 10,342,066 B2 * | 7/2019 | Decarreau | ............. | H04W 76/38 |
| 10,873,984 B2 * | 12/2020 | Hayashi | ................. | H04L 5/001 |
| 11,310,852 B2 * | 4/2022 | Hayashi | ................ | H04W 76/30 |
| 11,350,304 B1 * | 5/2022 | Marupaduga | ..... | H04W 28/0247 |
| 11,452,169 B2 * | 9/2022 | Wu | ........................ | H04W 76/15 |
| 11,540,214 B2 * | 12/2022 | Li | ..................... | H04W 52/0216 |
| 11,611,387 B2 * | 3/2023 | Cirik | .................... | H04B 7/0639 |
| 11,805,448 B2 * | 10/2023 | Hosseini | .............. | H04W 76/28 |
| 11,838,979 B2 * | 12/2023 | Martinez Tarradell | ..................... H04W 76/15 |
| 12,457,521 B2 * | 10/2025 | Stare | ................ | H04W 28/0284 |

(Continued)

FOREIGN PATENT DOCUMENTS

| | | | | | |
|---|---|---|---|---|---|
| KR | 20150035358 A | * | 4/2015 | .......... | H04L 5/0098 |
| WO | WO-2015197904 A1 | * | 12/2015 | ........ | H04W 36/0069 |

(Continued)

*Primary Examiner* — Joseph E Avellino
(74) *Attorney, Agent, or Firm* — HAUPTMAN HAM, LLP

(57)          ABSTRACT

Coordinated inactivity timer information element (IE) for dual connectivity. A Primary Node and a Secondary Node are established in a dual connectivity (DC) configuration. A Primary Node includes an Inactivity Timer IE that is communicated to the Secondary Node as part of Secondary Node addition process in Addition Request message. The Primary Node periodically evaluates resource congestion and when resource congestion occurs at the Primary Node. The Primary Node sends a New Inactivity Timer Value to a new incoming DC user in an Addition Request message and to existing DC users in a Modification Request message. Secondary Node detects the user data inactivity based on the inactivity timer received from Primary Node and indicates the user data inactivity to Primary Node. Primary Node decides either to release the UE or to move the UE to an inactive state based on the notification from Secondary Node.

20 Claims, 12 Drawing Sheets

(56)                    References Cited

U.S. PATENT DOCUMENTS

2020/0351729 A1 * 11/2020 Rastegardoost .. H04W 36/0072
2024/0008134 A1 * 1/2024 Martinez Tarradell ......................
                                                 H04W 76/27

FOREIGN PATENT DOCUMENTS

WO      WO-2016010001 A1 * 1/2016  ............ H04W 72/51
WO      WO-2016177102 A1 * 11/2016 ........ H04W 36/0079
WO      WO-2020088091 A1 * 5/2020  ............ H04W 72/21
WO      WO-2020088680 A1 * 5/2020  ............ H04W 52/02
WO      WO-2023246498 A1 * 12/2023 ............ H04W 76/34

* cited by examiner

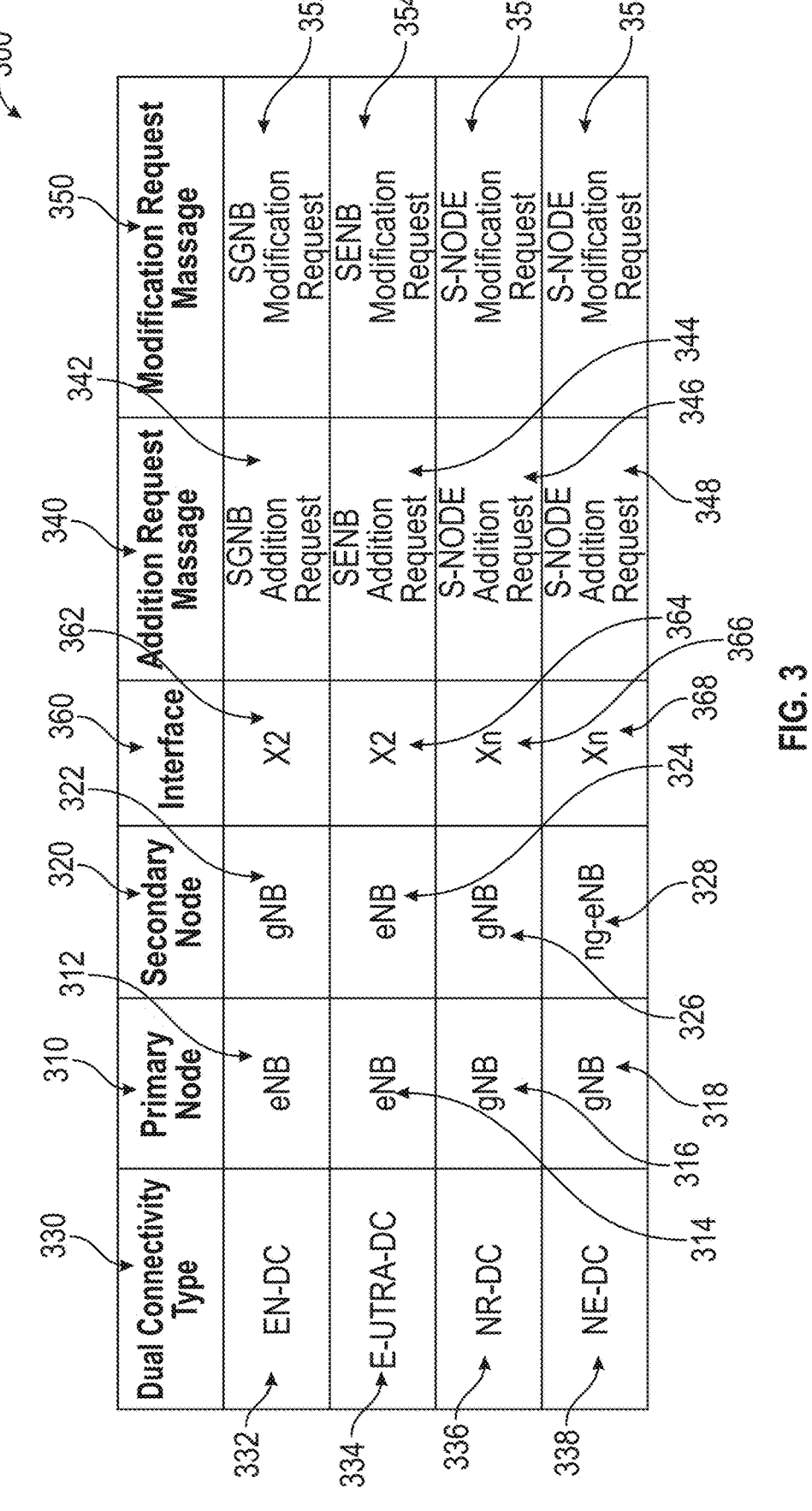

| Dual Connectivity Type | Primary Node | Secondary Node | Interface | Addition Request Massage | Modification Request Massage |
|---|---|---|---|---|---|
| EN-DC | eNB | gNB | X2 | SGNB Addition Request | SGNB Modification Request |
| E-UTRA-DC | eNB | eNB | X2 | SENB Addition Request | SENB Modification Request |
| NR-DC | gNB | gNB | Xn | S-NODE Addition Request | S-NODE Modification Request |
| NE-DC | gNB | ng-eNB | Xn | S-NODE Addition Request | S-NODE Modification Request |

FIG. 3

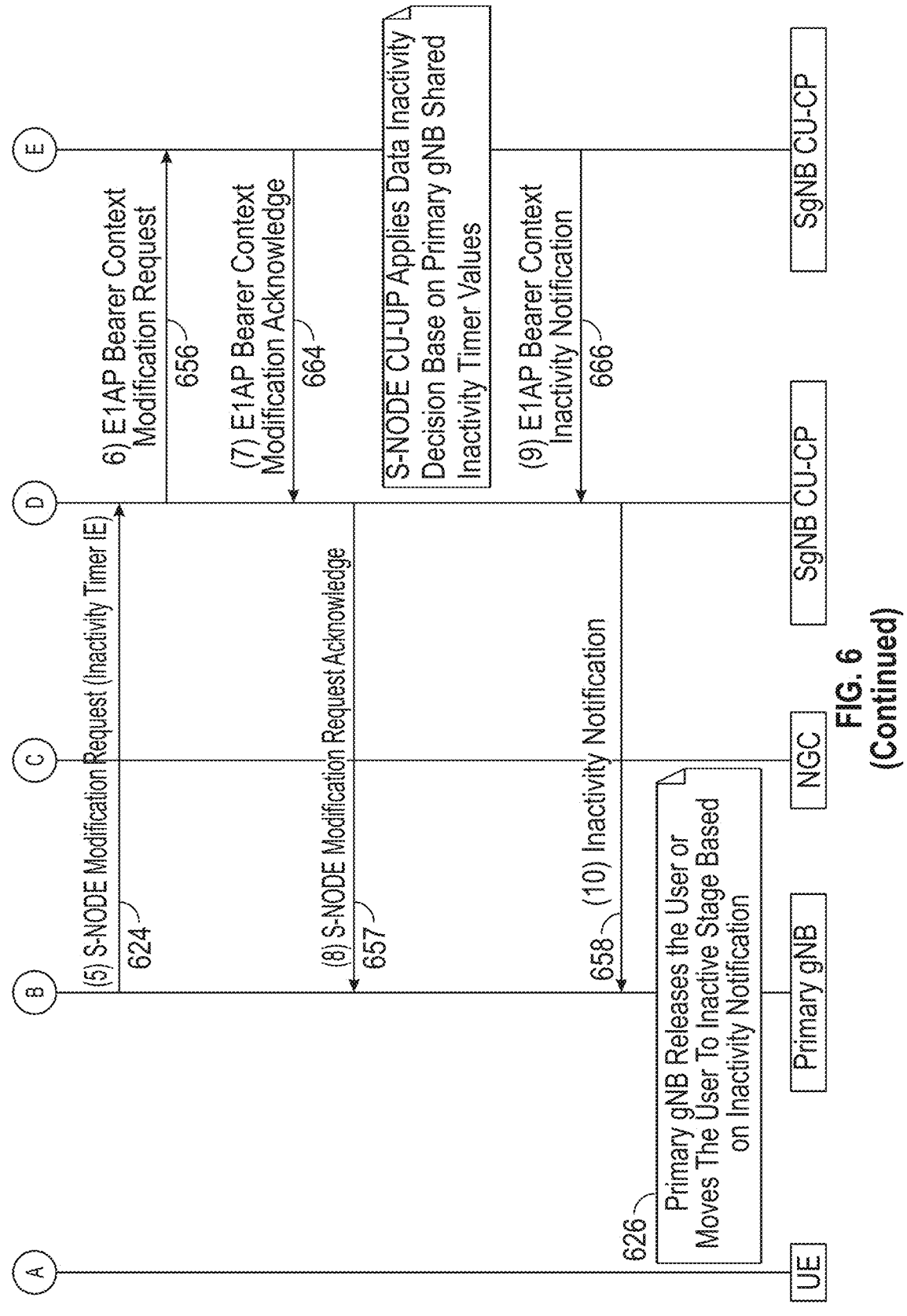

6) E1AP Bearer Context Modification Request
656

(7) E1AP Bearer Context Modification Acknowledge
664

S-NODE CU-UP Applies Data Inactivity Decision Base on Primary gNB Shared Inactivity Timer Values (9) E1AP Bearer Context Inactivity Notification
666

(5) S-NODE Modification Request (Inactivity Timer IE)
624

(8) S-NODE Modification Request Acknowledge
657

(10) Inactivity Notification
658

Inactivity Notification

Primary gNB Releases the User or Moves The User To Inactive Stage Based on Inactivity Notification
626

SgNB CU-CP

SgNB CU-CP

NGC

Primary gNB

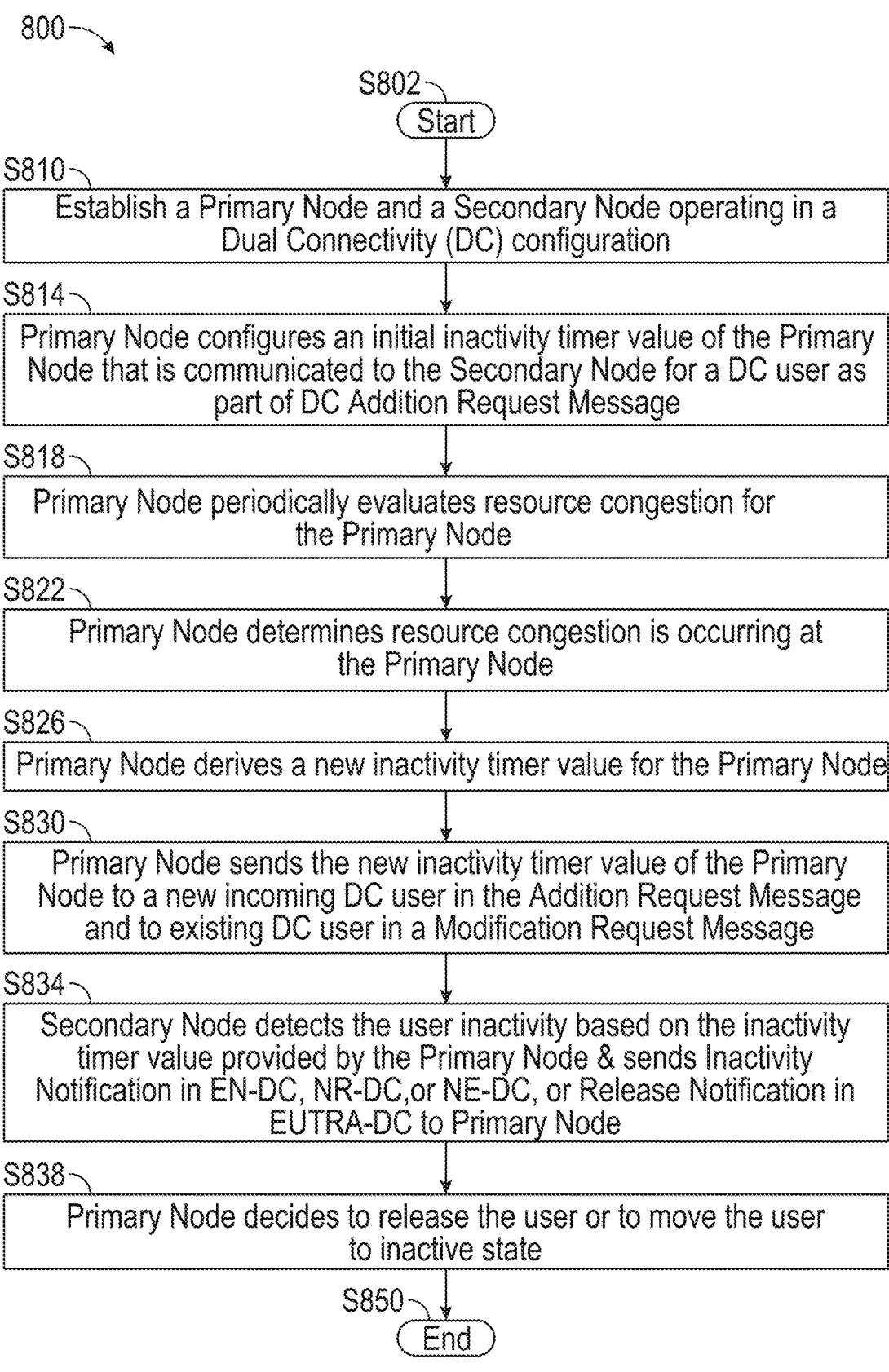

800

S802

Start

S810

Establish a Primary Node and a Secondary Node operating in a Dual Connectivity (DC) configuration

S814

Primary Node configures an initial inactivity timer value of the Primary Node that is communicated to the Secondary Node for a DC user as part of DC Addition Request Message

S818

Primary Node periodically evaluates resource congestion for the Primary Node

S822

Primary Node determines resource congestion is occurring at the Primary Node

S826

Primary Node derives a new inactivity timer value for the Primary Node

S830

Primary Node sends the new inactivity timer value of the Primary Node to a new incoming DC user in the Addition Request Message and to existing DC user in a Modification Request Message

S834

Secondary Node detects the user inactivity based on the inactivity timer value provided by the Primary Node & sends Inactivity Notification in EN-DC, NR-DC,or NE-DC, or Release Notification in EUTRA-DC to Primary Node

S838

Primary Node decides to release the user or to move the user to inactive state

S850

End

FIG. 8

COORDINATED INACTIVITY TIMER INFORMATION ELEMENT (IE) FOR DUAL CONNECTIVITY

TECHNICAL FIELD

This description relates to coordinated inactivity timer information element (IE) for dual connectivity, and method of using the same.

BACKGROUND

Dual Connectivity (DC) is a feature that was first introduced in 3GPP Rel-12 Evolved-Universal Terrestrial Radio Access (E-UTRA)-EUTRA Dual Connectivity (EUTRA-DC) to allow User Equipment (UE) to be connected to two Evolved NodeBs (eNBs) and send/receive packets via both eNBs. The Core Network (CN) is a Long-Term Evolution (LTE) Evolved Packet Core (EPC).

The architecture later evolved into 5G EUTRA-New Radio (NR) Dual Connectivity (EN-DC), so that a UE can be connected to both LTE E-UTRA and 5G NR nodes with the CN being an LTE EPC. The Dual Connectivity concept expanded to NR-NR dual connectivity (NR-DC) and NR-EUTRA Dual Connectivity (NE-DC), wherein the CN is a 5G Core (5GC) which is also referred to as Next Generation Core (NGC).

In EUTRA-DC/EN-DC/NR-DC/NE-DC architectures, an inactivity timer is used to monitor data inactivity independently, and separately, in the primary leg and secondary leg. However, congestion control related policies are controlled from the primary node because the primary node anchors the UE Radio Resource Control (RRC) connection. In the event of congestion, there are policies in the primary node to reduce/increase the user inactivity timer. Based on the updated user inactivity timer if some users being inactive for the duration, the users are released or moved to an inactive state thereby reducing the load and congestion on the network.

SUMMARY

In at least embodiment, a method for providing Coordinated inactivity timer information element (IE) for dual connectivity includes establishing dual connectivity of User Equipment (UE) with a Primary Node and a Secondary Node, determining resource congestion is occurring at the Primary Node, sending, from the Primary Node to the Secondary Node, a value of an inactivity timer for the UE of the Primary Node, detecting, by Secondary Node, user data inactivity based on the value of the inactivity timer received from Primary Node, indicating, by the Secondary Node, the user data inactivity to the Primary Node, and deciding, by the Primary Node, to release the UE or to move the UE to an inactive state based on the Secondary Node indicating the user data inactivity to the Primary Node.

In at least one embodiment, a node in a dual connectivity mode includes a memory storing computer-readable instructions, and a processor connected to the memory, wherein the processor is configured to execute the computer-readable instructions to establish dual connectivity of User Equipment (UE) with a Primary Node and a Secondary Node, determine resource congestion is occurring at the Primary Node, send, from the Primary Node to the Secondary Node, a value of an inactivity timer for the UE of the Primary Node, detect, by the Secondary Node, user data inactivity based on the value of the inactivity timer received from Primary Node, indicate, by the Secondary Node, the user data inactivity to Primary Node, and decide, by the Primary Node, to release the UE or to move the UE to an inactive state based on the Secondary Node indicating the user data inactivity to the Primary Node.

In at least one embodiment, a non-transitory computer-readable media having computer-readable instructions stored thereon, which when executed by a processor causes the processor to perform operations for establishing dual connectivity of User Equipment (UE) with a Primary Node and a Secondary Node, determining resource congestion is occurring at the Primary Node, sending, from the Primary Node to the Secondary Node, a value of an inactivity timer for the UE of the Primary Node, detecting, by the Secondary Node, user data inactivity based on the value of the inactivity timer received from Primary Node, indicating, by the Secondary Node, the user data inactivity to the Primary Node, and deciding, by the Primary Node, to release the UE or to move the UE to an inactive state based on the Secondary Node indicating the user data inactivity to the Primary Node.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

FIG. 3 illustrates Xn/X2 interface messages for synchronizing inactivity timers of primary nodes and secondary nodes according to at least one embodiment.

FIG. 8 is a flow chart of a method for providing coordinated inactivity timer for dual connectivity according to at least one embodiment.

DETAILED DESCRIPTION

Figure 1:
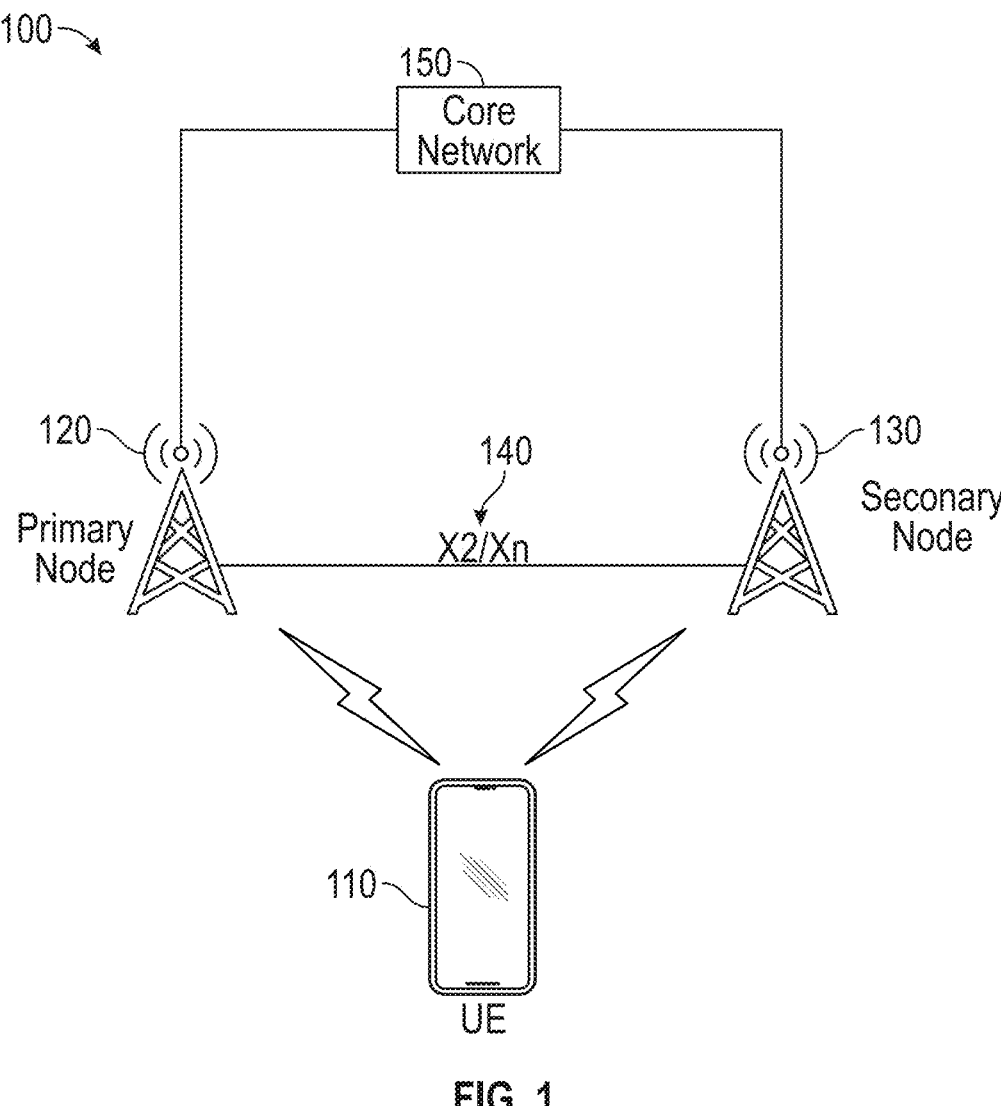
FIG. 1 illustrates the general concept of dual connectivity according to at least one embodiment.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, or any data-stream or signaling-stream. The foregoing terms are utilized interchangeably in the subject specification and related drawings. The terms "access point," "base station," "NodeB," "evolved NodeB (eNodeB or eNB)," next generation NodeB (gNodeB or gNB), next generation Evolved NodeB (ng-eNB), home NodeB (HNB)," "home access point (HAP)," or the like refer to a wireless network component or apparatus that serves and receives data, control, voice, video, sound, gaming, or any data-stream or signaling-stream from UE.

In at least embodiment, a method for providing Coordinated inactivity timer information element (IE) for dual connectivity includes establishing dual connectivity of User Equipment (UE) with a Primary Node and a Secondary Node, determining resource congestion is occurring at the Primary Node, sending, from the Primary Node to the Secondary Node, a value of an inactivity timer for the UE of the Primary Node, detecting, by Secondary Node, the user data inactivity based on the value of the inactivity timer received from Primary Node, indicating, by the Secondary Node, the user data inactivity to the Primary Node, and deciding, by the Primary Node, to release the UE or to move the UE to an inactive state based on the Secondary Node indicating the user data inactivity to the Primary Node.

Embodiments described herein provide a method that provides one or more advantages over prior messaging that did not enable the primary node to communicate an adjustment to the inactivity timer to the secondary node. For example, an Inactivity Timer IE is added to Addition Request Messages and Modification Request Messages so that a Primary Node is able to share the Coordinated Inactivity Timer with a Secondary Node in a dual connectivity implementation. The addition of the Inactivity Timer IE to the Addition Request Messages and Modification Request Messages enables the secondary node to synchronize with decisions made by the primary node. The Primary node is able to change the Inactivity Timer dynamically based on a threshold or algorithm, and the Coordinated Inactivity Timer helps to reduce the primary cell overload by releasing the Dual Connectivity inactive users or moving the Dual Connectivity inactive users to an inactive state after detecting cell congestion. Other new incoming users are thus provided the opportunity to attach to the Primary Node. Primary node resources are able to be utilized efficiently during Dual Connectivity establishment.

FIG. 1 illustrates the general concept of dual connectivity 100 according to at least one embodiment.

In FIG. 1, User Equipment (UE) 110 is connected to two Nodes 120, 130. One Node is called the Master Node (MN) 120 and the other Node is called the Secondary Node (SN) 130. The MN 120 is also referred to as the Primary Node. MN 120 is the node to which the UE 110 first connects. Subsequently, using Radio Resource Control (RRC) protocol signaling messages via the MN 120, the UE 110 connects to the SN 130.

MN 120 is able to be an Evolved NodeB (eNB) in Evolved-Universal Terrestrial Radio Access (E-UTRA) New Radio (NR)-Dual Connectivity (EN-DC) and Evolved-Universal Terrestrial Radio Access (E-UTRA)-EUTRA Dual Connectivity (EUTRA-DC). MN 120 is a Next Generation NodeB (gNB) in New Radio (NR)-Dual Connectivity (NR-DC) and NR-EUTRA Dual Connectivity (NE-DC). Similarly, a SN 130 is able to be an eNB in E-UTRA-DC, a gNB in EN-DC, and NR-DC, or a Next Generation Evolved NodeB (ng-eNB) in NE-DC.

An interface 140 is used to connect multiple Nodes 120, 130. Interface 140 is able to be an X2 interface that has a control-plane (X2-C) and a user-plane (X2-U) component. The X2-U is responsible for the transport of user data packets between eNBs. Interface 140 is also able to be an Xn interface that is used for the exchange of signaling information between two NG-RAN nodes, i.e., between two gNBs, or between a gNB and a ng-eNB. Interface 140 is also able to be a private interface, wherein the protocol for Interface 140 uses private or vendor specific information.

Historically, only MN 120 provided the control plane connection between the UE 110 and the Core Network (CN) 150. SN 130 provided only additional resources to carry user plane traffic. However, with the later introduction of split SRB and SRB3, SN 130 is also able to carry signaling messages.

FIGS. 2A-D illustrate different Dual Connectivity modes 200 according to at least one embodiment.

Figures 2A, 2B:
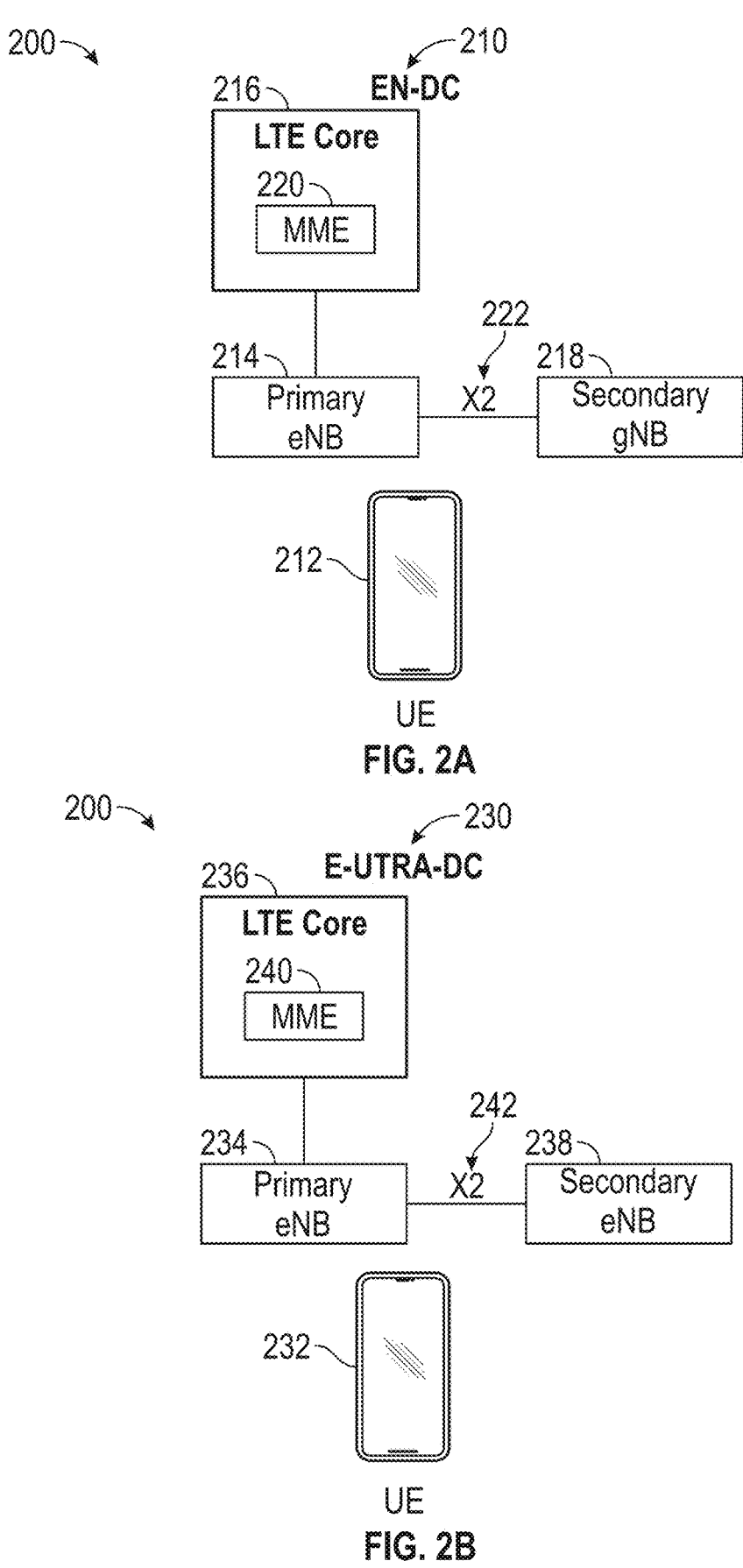
FIGS. 2A-D illustrate different Dual Connectivity modes according to at least one embodiment.

FIG. 2A shows the EUTRA-New Radio (NR) Dual Connectivity (EN-DC) implementation 210. In FIG. 2A, UE 212 attaches to 4G node, Primary eNB node 214, which provides the signaling anchor for communication with the Core Network, Long Term Evolution (LTE) Evolved Packet Core (EPC) network 216. For Dual Connectivity, UE 212 also attaches to a 5G node, Secondary gNB 218. Primary eNB node 214 connects via Mobility Management Entity (MME) 220 with 4G LTE EPC network 216. UE 212 communicates with both Primary eNB (eNodeB) 214 and Secondary gNB 218, but communications (signaling and data) are routed through the LTE core network 210. Primary eNB 214 and Secondary gNB 218 are connected via an X2 interface 222.

Primary eNB Node 214 maintains connection state transitions, handles connection setup and release, and initiates first time secondary node addition (EN-DC setup).

Normally, the Core Network, e.g., 4G LTE EPC network 216, sends user data to the Primary Node, e.g., Primary eNB node 214. However, with Dual Connectivity, there are different types of implementations, and the Core Network is able to send data to the Primary Node or to the Secondary Node. This is an operator deployment specific configuration. The radio protocol architecture that a particular bearer uses depends on how the bearer is set up. In response to the data being sent to the Primary Node, then it is Master Mode Initiated Data. In response to the data being provided to the Secondary Node, an SN-Split or SN-SCG bearer is used.

SN-Split Bearer is a bearer where data is provided from the core network, e.g., 4G LTE EPC network 216, to the Secondary Node, e.g., gNB Node 218, and then split to forward by the Secondary Node 218 to both the UE 212 and the Primary Node, e.g., Primary eNB Node 214. SN-SCG Bearer is a bearer where the data from the core network, e.g., 4G LTE EPC network 216, is sent to the Secondary Node, and then directly to the UE 212. Secondary gNB Node 218 is connected to LTE EPC 216 only on user plane.

EN-DC 210 enables a mobile operator to support New Radio 5G data with existing LTE core 216 and radio networks without introducing 5G core network. EN-DC 210 is useful for networks where LTE provides reliable coverage and NR can be used for improving data rates.

FIG. 2B shows the E-UTRA-DC implementation 230. In FIG. 2B, UE 232 attaches to 4G node, Primary eNB node 234, which provides the signaling anchor for communication with the Core Network 236. For Dual Connectivity, UE 212 also attaches to a second 4G node, Secondary eNB 238. Primary eNB node 214 connects via MME 240 with 4G LTE EPC network 236. UE 232 communicates with both Primary eNB 234 and Secondary eNB 238. Primary eNB 234 and Secondary eNB 238 are connected via an X2 interface 242.

Again, Primary eNB 234 maintains connection state transitions, handles connection setup and release, and initiates first time secondary node addition (E-UTRA-DC setup). Secondary eNB Node 238 is added with Secondary Node (SN)-Split or SN-Secondary Cell Group (SCG) Bearer. Secondary eNB Node 238 is connected to LTE EPC 236 only on the user plane.

Figure 2C:
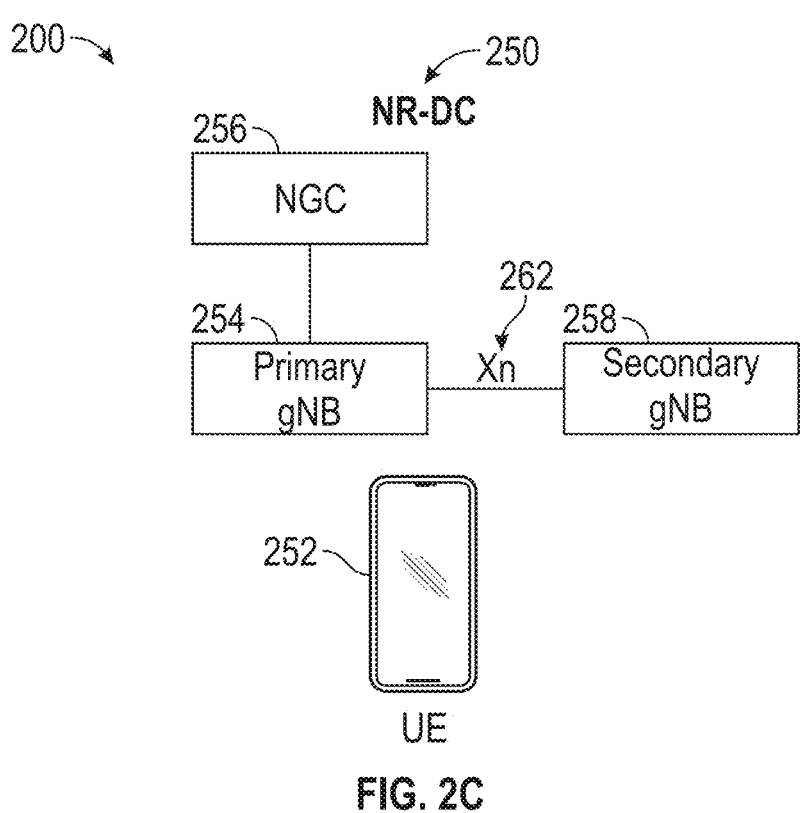

FIG. 2C shows the NR-DC implementation 250. In FIG. 2C, UE 252 attaches to 5G node, Primary gNB node 254, which provides the signaling anchor for communication with the Core Network 256. For Dual Connectivity, UE 252 also attaches to a second 5G node, Secondary gNB 258. Primary gNB node 254 is able to be a sub-6 GHz node (gNB) and Secondary gNB node 258 is able to be a mmWave node (gNB). By utilizing both sub-6 GHz and mmWave, Dual Connectivity couples the broader reach of the mid-band with the faster speeds of mmWave. Primary gNB node 254 connects to standalone 5G Core (5GC) network 256, which is also referred to as (NGC). UE communicates with both Primary gNB 254 and Secondary gNB 258. Primary eNB 254 and Secondary gNB 258 are connected via an Xn interface 262.

Again, Primary gNB 254 maintains connection state transitions, handles connection setup and release, and initiates first time secondary node addition (NR-DC setup). Secondary gNB Node 258 is added with Secondary Node (SN)-Split or SN-Secondary Cell Group (SCG) Bearer. Secondary gNB Node is connected to NGC on the user plane. NR-DC 250 combines different types of radio spectrum to enable mobile 5G UE 252 to wirelessly achieve wired broadband-class speeds, even in challenging conditions such as crowded venues and transit hubs.

Figure 2D:
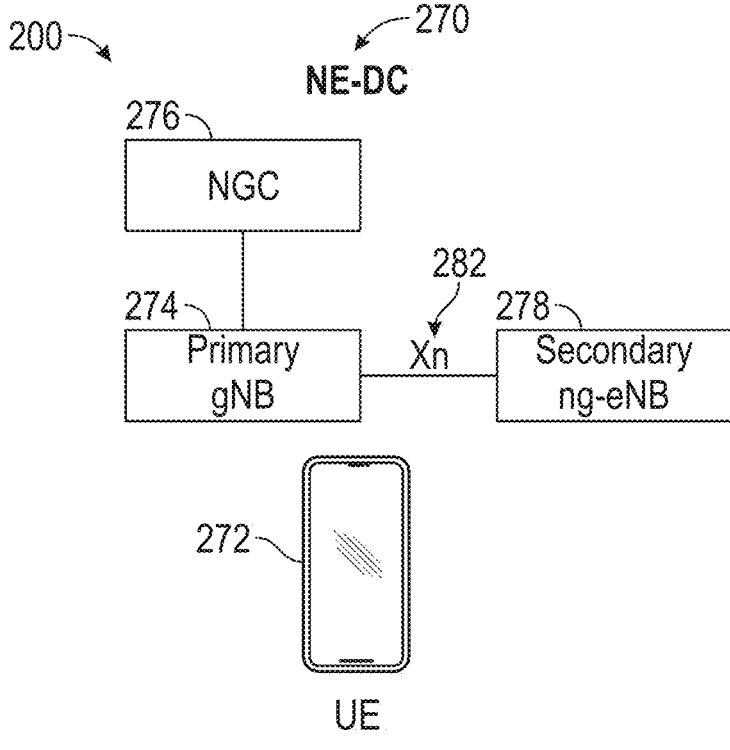

FIG. 2D shows the NE-DC implementation 270. In FIG. 2D, UE 272 attaches to 5G node, Primary gNB node 274, which provides the signaling anchor for communication with the Core Network 276. For Dual Connectivity, UE 272 also attaches to a 4G node, Secondary Next Generation Evolved NodeB (ng-eNB) 278. The ng-eNB node 278 is an upgraded eNB that interworks with the 5GC 276 or gNB 274. This option supports NE-DC 270 to aggregate NR and LTE traffic. Primary gNB node 274 connects to 5G Core (5GC) network 276, which is also referred to as (NGC). UE

272 communicates with both Primary gNB 274 and Secondary ng-eNB 278. Primary eNB 274 and Secondary ng-eNB 278 are connected via an Xn interface 282.

Again, Primary gNB 274 maintains connection state transitions, handles connection setup and release, and initiates first time secondary node addition (NR-DC setup). Secondary ng-eNB Node 278 is added with Secondary Node (SN)-Split or SN-Secondary Cell Group (SCG) Bearer. From a control plane perspective, the Primary gNB 274 is connected to the NGC 276, and the Primary gNB 274 operates with the Secondary ng-eNB 278 via the Xn interface 282. In response to the traffic split implemented at the NGC 276, the Secondary ng-eNB 278 is able to transmit user plane traffic from the NGC 276 toward the UE 272 directly, or forward a part of the traffic indirectly to Primary gNB 274 via the Xn interface 282.

Previously, a Primary Node does not have control over UE data inactivity detection on the Secondary Node, whereas the UE/bearer inactivity decision is based on the Secondary Node only. In response to the Primary Node being overloaded or underloaded, the Primary Node cannot decrease or increase Inactivity Timer values of the Secondary Node because of data Inactivity Timer IE support is not available over the X2 Application Protocol (AP) or Xn AP control messages. Also, a Primary Node cannot change the Inactivity Timer dynamically based on the threshold/algorithm on the Secondary Node.

Thus, in response to congestion occurring at the Primary Node, the Primary Node cannot control or interfere to reduce the inactivity timer values of the Secondary Node to reduce the network load.

FIG. 3 illustrates Xn/X2 interface messages 300 for synchronizing inactivity timers of primary nodes and secondary nodes according to at least one embodiment.

A Primary Node 310 and Secondary Node 320 are configured with separate Inactivity Timer values to detect user inactivity. Normally, Primary Node 310 is able to control cell congestion for data received at the Primary Node 310 from the Core Network based on operator configured fixed values or dynamically based on an algorithm. For example, in E-UTRA, according to 3GPP TS 36.300 clause 7.3a.3 step 1, a node is able to suspend an RRC connection due to a trigger, such as expiration of the a UE Inactivity Timer. According to 3GPP TS 23.401 clause 5.3.5, initiation of an S1 release is initiated by an eNB node based on cause, such as user inactivity. Similarly in NR, the Primary Node (gNB) 310 and the Secondary Node (gNB) 320 are able to control their own user inactivity timers independently, based on operator configured initial values or dynamically based on any algorithm within the gNB.

In case of Dual Connectivity 330 where SN Split or SN SCG bearer is implemented, Primary Node 310 does not have control over UE Data inactivity detection on Secondary Node 320, and UE/bearer inactivity decision is based only on the Secondary Node 320. In response to an SN-Split, the data comes to the secondary node, and the data is forwarded from the Secondary Node 320 to the Primary Node 310 and UE. In response to Secondary Cell Group (SCG) Bearer, data is sent directly from Core Network to Secondary Node 320 and then straight to the UE. Thus, in in both cases, since data is flowing in the Secondary Node 320, only the Secondary Node 320 is able to control or monitor the data.

The 5G radio network layer signaling protocol for the E1 interface provides a means for interconnecting a gNB-CU-CP and a gNB-CU-UP of a gNB within an NG-RAN. 3GPP TS 38.463 clause 8.3.1.2 introduced an Inactivity Timer IE that is contained in BEARER CONTEXT SETUP REQUEST message that is sent by the gNB-CU-CP to request the gNB-CU-UP to setup a bearer context. 3GPP TS 38.463 clause 9.2.2.1 defines the BEARER CONTEXT SETUP REQUEST message. 3GPP TS 38.463 clause 8.3.2.2 introduced an Inactivity Timer IE that is contained in BEARER CONTEXT MODIFICATION REQUEST message that is sent by the gNB-CU-CP to request the gNB-CU-UP to modify a bearer context. 3GPP TS 38.463 clause 9.2.2.4 defines the BEARER CONTEXT MODIFICATION REQUEST message. The Inactivity Timer IE is defined in 3GPP TS 38.463 clause 9.3.1.54.

In Dual Connectivity Modes 330, Primary Node 310 is not able to decrease or increase the values of inactivity timer of the Secondary Node 320 because Inactivity Timer IE support is not available over X2 Application Protocol (AP) or Xn AP control messages. Also, the Primary Node 310 cannot change the Inactivity Timer dynamically based on the threshold/algorithm on the Secondary Node 320.

To address this problem, a Primary Node and a Secondary Node are established in a dual connectivity (DC) configuration. A Primary Node includes an Inactivity Timer IE that is communicated to the Secondary Node. The Primary Node periodically evaluates resource congestion and when resource congestion occurs at the Primary Node. The Primary Node derives a New Inactivity Timer Value for the Primary Node. An inactivity timer IE is added to Addition Request Messages 340 and Modification Request Messages 350. Here, the same timer value is used to enable the Primary Node 310 to configure initial UE inactivity timer values for new users over an Interface 360, and to configure UE inactivity timer values for existing users dynamically based on, for example, an algorithm or condition. The Primary Node 310 sends the New Inactivity Timer Value to a new incoming DC user in the Addition Request message 340 and to existing DC users in the Modification Request message 350. Secondary Node 320 detects the user data inactivity based on the value of the inactivity timer received from Primary Node 310 and indicates the user data inactivity to Primary Node 310. Primary Node 310 decides to either release the UE or to move the UE to an inactive state based on Secondary Node 320 indicating the user data inactivity to the Primary Node 310.

In FIG. 3, Addition Request Messages 340 and Modification Request Messages 350 are shown for four Dual Connectivity Types 330 according to at least one embodiment. The Primary Node 310 sends a New Inactivity Timer Value of the Primary Node 310 to a new incoming DC user in the Addition Request Message 340 and to existing DC users in a Modification Request Message 350.

For Evolved-Universal Terrestrial Radio Access (E-UTRA) New Radio (NR)-Dual Connectivity (EN-DC) 332, the Primary Node 310 is an Evolved NodeB (eNB) 312 and the Secondary Node 320 is a Next Generation NodeB (gNB) 322. In at least one embodiment, the Primary eNB 312 communicates a value of the Inactivity Timer to the Secondary gNB 322 using a SGNB ADDITION REQUEST message 342 and a SGNB MODIFICATION REQUEST message 352 via an X2 interface 362. The Inactivity Timer is able to be added to 3GPP TS 36.423 Clause 9.1.4.1 that defines the SGNB ADDITION REQUEST message 342, which is sent by the Primary eNB Node 312 to the Secondary gNB Node 322 for EN-DC operation so that the Inactivity Timer of the Secondary Node (gNB) 322 is synchronized with the Inactivity Timer of the Primary Node (eNB) 312. The Inactivity Timer is also able to be added to 3GPP TS 36.423 Clause 9.1.4.5 that defines the SGNB MODIFI- CATION REQUEST message 352, which is sent by the Primary eNB Node 312 to the Secondary gNB Node 322 for EN-DC operation 332.

For Evolved-Universal Terrestrial Radio Access (E-UTRA)-EUTRA Dual Connectivity (EUTRA-DC) 334, the Primary Node 310 is an eNB node 314 and the Secondary Node 320 is also an eNB node 324. In at least one embodiment, the Primary eNB 314 communicates a value of the Inactivity Timer to the Secondary eNB Node 324 using a SENB ADDITION REQUEST message 344 and a SENB MODIFICATION REQUEST message 354 via an X2 interface 364. The Inactivity Timer is able to be added to 3GPP TS 36.423 Clause 9.1.3.1 defines the SENB ADDITION REQUEST message 344, which is sent by the Primary eNB Node 314 to the Secondary eNB Node 324 for E-UTRA-DC 334 so that the Inactivity Timer of the Secondary Node (eNB) 324 is synchronized with the Inactivity Timer of the Primary Node (eNB) 314. The Inactivity Timer is also able to be added to 3GPP TS 36.423 Clause 9.1.3.5 defines the SENB MODIFICATION REQUEST message 354 for E-UTRA-DC 334.

For New Radio (NR)-Dual Connectivity (NR-DC) 336, the Primary Node 310 is a gNB node 316 and the Secondary Node 320 is also a gNB node 326. In at least one embodiment, Primary gNB 316 communicates a value of the Inactivity Timer to the Secondary gNB 326 using a S-NODE ADDITION REQUEST message 346 and a S-NODE MODIFICATION REQUEST message 356 via an Xn interface 366.

For NR-EUTRA Dual Connectivity (NE-DC) 338, the Primary Node 310 is a gNB node 318 and the Secondary Node 320 is a ng-gNB node 328. In at least one embodiment, the Primary gNB 318 communicates a value of the Inactivity Timer to the Secondary ng-eNB 328 using a S-NODE ADDITION REQUEST message 348 and a S-NODE MODIFICATION REQUEST message 358 via an Xn interface 368.

The Inactivity Timer is able to be added to 3GPP TS 38.423 Clause 9.1.2.1 define the S-NODE ADDITION REQUEST messages 346, 348, which is sent by a gNB 316, 318 to a Secondary gNB 326 for NR-DC 336 or to a Secondary ng-eNB Node 328 for NE-DC 338 so that the Inactivity Timer of the Secondary Node, gNB 326 or ng-eNB 328 is synchronized with the Inactivity Timer of the Primary Node (gNB) 316, 318. The Inactivity Timer is also able to be added to 3GPP TS 38.423 Clause 9.1.2.5 defines the S-NODE MODIFICATION REQUEST messages 356, 358 which is sent by a gNB 316, 318 to a Secondary gNB 326 for NR-DC 336 or to a Secondary ng-eNB Node 328 for NE-DC 338.

Thus, Embodiments described herein provides coordinated Inactivity Timer Information Element (IE) for dual connectivity so that an Inactivity Timer of the Primary Node 310 is shared with a Secondary Node 320 in a Dual Connectivity configuration 330.

The Primary Node 310 monitors resource congestion and derives a New Inactivity Timer Value for the Primary Node 310. The Primary Node 310 derives the new Inactivity Timer value based on a congestion threshold or algorithm. In response to the Primary Node 310 determining congestion is occurring, the Primary Node 310 adjusts an Inactivity Timer of the Primary Node 310. The Primary Node 310 is able to increase the Inactivity Timer, or reduce the Inactivity Timer to control the user to avoid the congestion.

Accordingly, the value of the Inactivity Timer of the Primary Node 310 is able to be communicated to the Secondary Node 320 using an Interface, for example, X2 interface 362, 364 or an Xn interface 366, 368. However, in at least one embodiment, the value of the Inactivity Timer of the Primary Node 310 is able to be communicated to the Secondary Node 320 using a private message interface. In at least one embodiment, the value of the Inactivity Timer of the Primary Node 310 is able to be communicated to the Secondary Node 320 using other messaging interfaces between the Primary Node 310 and the Secondary Node 320.

The Secondary Node 320 is thus able to apply a change to the Inactivity Timer of the Secondary Node 320 so that the Inactivity Timers of the Primary Node 310 and the Secondary Node 320 are synchronized. By the Primary Node 310 being able to share the value of the Inactivity Timer of the Primary Node 310 with the Secondary Node 320, a user is able to be released sooner. Other users are provided the opportunity to attach to the network.

In at least one embodiment, the dynamically updated inactivity timer value is able to be communicated from a Primary Node 310 to a Secondary Node 320 for new users via a SGNB ADDITION REQUEST message 342 in EN-DC 332, via a SENB ADDITION REQUEST message 344 in EUTRA-DC 334, or via S-NODE ADDITION REQUEST messages 346, 348 in NR-DC 336 or NE-DC 338, and for existing users via a SGNB MODIFICATION REQUEST message 352 in EN-DC 332, via a SENB MODIFICATION REQUEST message 354 in EUTRA-DC 334, or via S-NODE MODIFICATION REQUEST messages 356, 358 in NR-DC 336 or NE-DC 338.

In at least one embodiment, the value in the Inactivity Timer IE is able to be sent to all the existing users or to existing users based on a Subscriber Profile ID (SPID) or to existing users which belong to a particular Secondary Node 320, e.g., gNB, eNB, or ng-eNB or the Inactivity Timer IE sent along with a Modification Request message initiated based on a non-inactivity purpose, e.g., ERAB addition or ERAB release for applying the updated value of Inactivity Timer IE to the Secondary Node 320.

Figure 4:
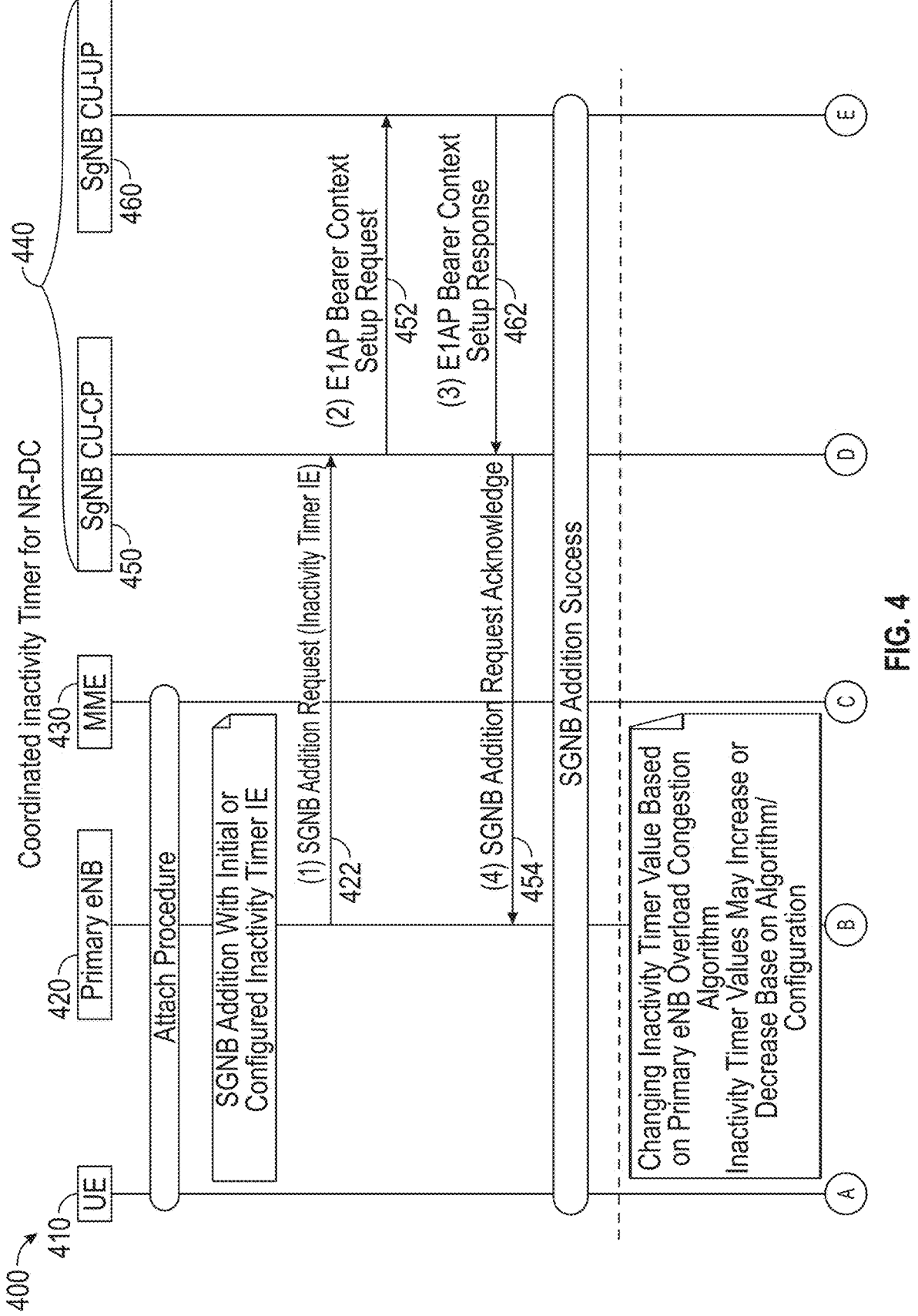
FIG. 4 illustrates EN-DC user call flow for providing Coordinated UE Inactivity Timer according to at least one embodiment.
Figure 4:
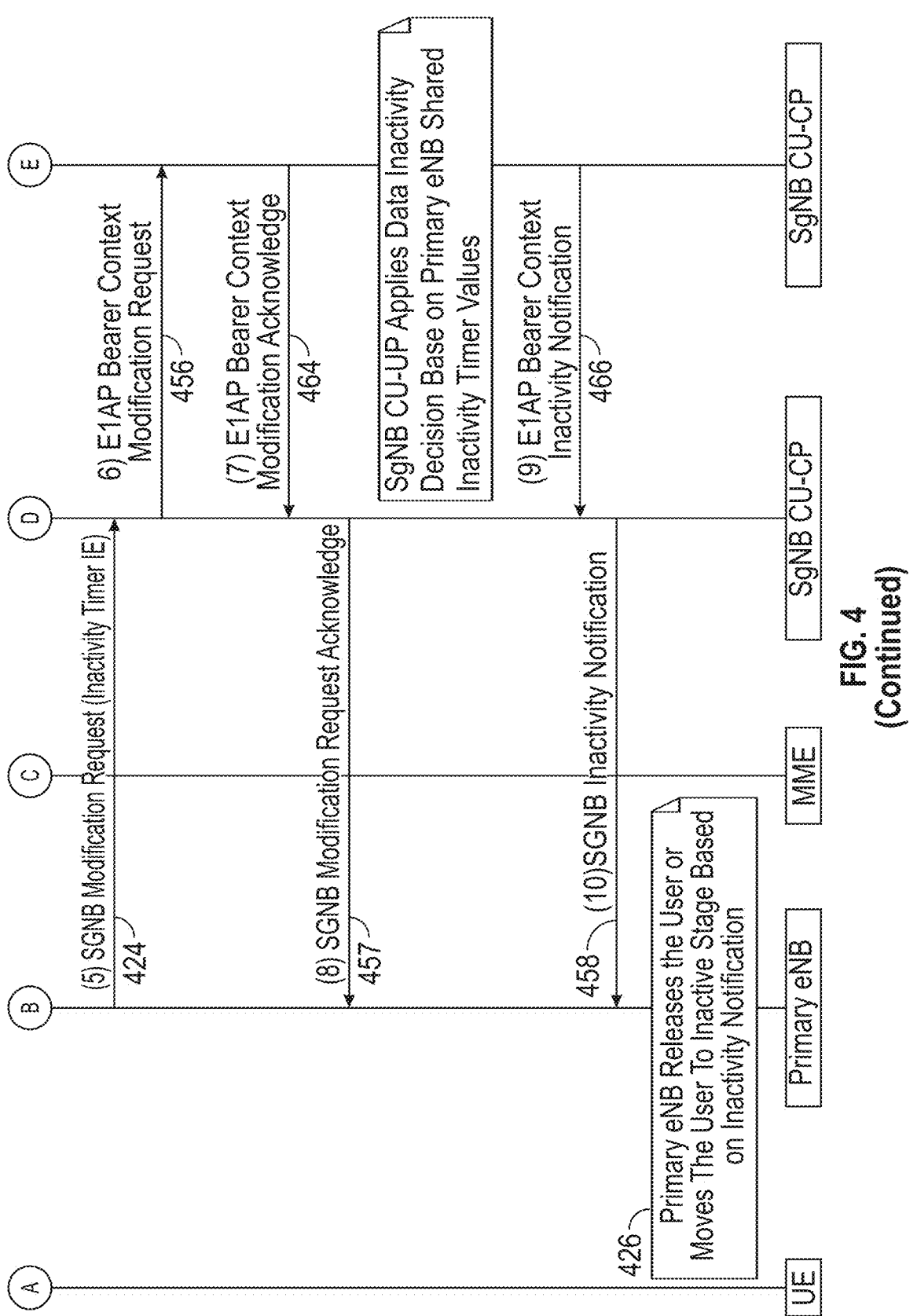

FIG. 4 illustrates EN-DC user call flow 400 for providing Coordinated UE Inactivity Timer according to at least one embodiment.

In FIG. 4, a UE 410 connects with a Primary eNB 420 via Mobility Management Entity (MME) 430. Primary eNB 420 established EN-DC with a Secondary gNB 440. Secondary gNB 440 includes Central Unit-Control Plane (CU-CP) 450 and Central Unit-User Plane (CU-UP) 460.

As mentioned above, the Inactivity Timer IE is already used for the BEARER CONTEXT SETUP REQUEST message and BEARER CONTEXT MODIFICATION REQUEST message sent by the CU-CP 450 to the CU-UP 460. To enable a primary node to control dual connectivity of users, a coordinated UE Inactivity Timer IE is added to SGNB ADDITION REQUEST message to allow the primary eNB to configure initial UE inactivity Timer values for new EN-DC users. In addition, a UE inactivity Timer IE is included in SGNB MODIFICATION REQUEST message to allow the primary eNB to configure the existing EN-DC users dynamically based on the algorithm or some condition. In at least one embodiment, the SGNB ADDITION REQUEST message and the SGNB MODIFICATION REQUEST message are able to be sent using the X2 interface.

In FIG. 4, Primary eNB 420 configures Initial UE Inactivity Timer IE in SGNB ADDITION REQUEST message 422 for EN-DC users that is communicated to the Secondary gNB (SgNB) node 440 over an X2 interface.

At the SgNB 440, CU-CP 450 configures the received UE Inactivity Timer values from the Primary eNB via E1AP BEARER CONTEXT SETUP REQUEST message 452 that is sent by the CU-CP 450 to the to SgNB CU-UP 460.

The SgNB CU-UP 460 applies the received UE Inactivity Timer values to monitor the User Data detection from the serving gateway (S-GW). The S-GW is the user-plane node connecting the EPC to the RAN, e.g., SgNB.

After Applying the UE Inactivity Timer values, SgNB CU-UP 460 sends an E1AP BEARER CONTEXT SETUP RESPONSE message 462 to SgNB CU-CP 450. SgNB CU-CP 450 sends an SGNB ADDITION REQUEST ACKNOWLEDGE message 454 to the Primary eNB 420.

The Primary eNB 420 is able to change the value of the Inactivity Timer at the Primary eNB 420 based on a congestion algorithm of the Primary eNB 420. The Primary eNB 420 is able to increase or decrease the value of the Inactivity Timer at the Primary eNB 420 based on the congestion algorithm and configuration settings. Resource congestion is determined to be occurring at the Primary eNB 420 based on one or more of a number of RRC connected users, UE resource congestion, or signaling load in the Primary Node.

The Primary eNB 420 dynamically configures a modified value of the Inactivity Timer and sends the modified value of the Inactivity Timer to the SgNB 440 in a SGNB MODIFICATION REQUEST message 424.

The SgNB CU-CP 450 configures the received Inactivity Timer values from Primary eNB 420 via E1AP BEARER CONTEXT MODIFICATION REQUEST message 456 that is sent to the SgNB CU-UP 460.

The SgNB CU-UP 460 applies the newly received Inactivity Timer values to monitor the user data detection from the S-GW. The SgNB CU-UP 460 sends an E1AP BEARER CONTEXT MODIFICATION RESPONSE message 464 to the SgNB CU-CP 450.

The SgNB CU-CP 450 sends an SGNB MODIFICATION ACKNOWLEDGE message 457 to the Primary eNB 420.

The SgNB CU-UP 460 monitors the UE data inactivity based on the newly received UE Inactivity Timer values and sends E1AP BEARER CONTEXT INACTIVITY NOTIFICATION message 466 to SgNB CU-CP 450.

SgNB CU-CP 450 sends SGNB INACTIVITY NOTIFICATION message 458 to Primary eNB 420. In response, the Primary eNB 420 decides to release the UE or to move the UE to an INACTIVE state 426.

Figure 5:
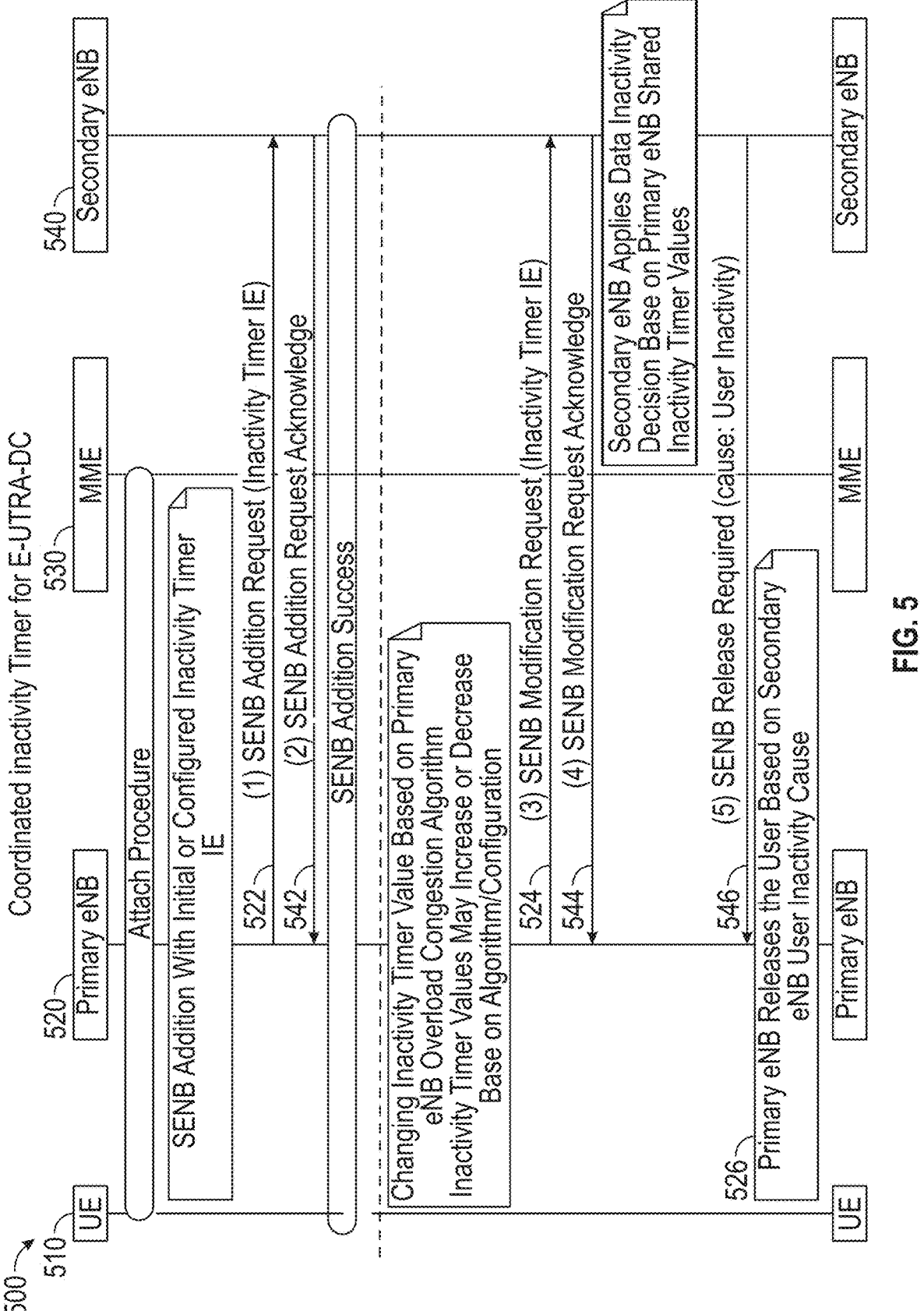
FIG. 5 illustrates EUTRA-DC user call flow for providing Coordinated UE Inactivity Timer according to at least one embodiment.

FIG. 5 illustrates EUTRA-DC user call flow 500 for providing Coordinated UE Inactivity Timer according to at least one embodiment.

In FIG. 5, a UE 510 connects with a Primary eNB 520 via Mobility Management Entity (MME) 530. Primary eNB 520 established E-UTRA-DC with Secondary gNB 540. Primary eNB 520 configures an Initial UE Inactivity Timer IE in SENB ADDITION REQUEST message 522 for EUTRA-DC users that is communicated to the Secondary gNB 540 over an X2 interface.

The Secondary eNB 540 configures the received UE Inactivity Timer values received from the Primary gNB 520 at the GPRS Tunnelling Protocol-User Plane (GTP-U) layer in the Secondary eNB 540.

The GTP-U layer in the Secondary eNB 540 applies the received UE Inactivity Timer values to monitor the user data detection from S-GW.

After Applying the UE Inactivity Timer values, the Secondary eNB 540 sends a SENB ADDITION REQUEST Acknowledge message 542 to the Primary eNB 520.

The Primary eNB 520 is able to change the value of the Inactivity Timer at the Primary eNB 520 based on a congestion algorithm of the Primary eNB 520. The Primary eNB 520 is able to increase or decrease the value of the Inactivity Timer at the Primary eNB 520 based on the congestion algorithm and configuration settings.

The Primary eNB 520 dynamically configures a modified value of the Inactivity Timer and sends the modified value of the Inactivity Timer to the Secondary eNB 540 in a SENB MODIFICATION REQUEST message 524 for existing EUTRA-DC users.

The Secondary eNB 540 configures the received modified value of the Inactivity Timer received from the Primary eNB 520 at the GTP-U layer.

The Secondary eNB 540 sends a SENB MODIFICATION ACKNOWLEDGE message 544 to the Primary eNB 520.

The Secondary eNB 540 monitors the UE data inactivity based on the received modified value of the Inactivity Timer and sends SENB RELEASE REQUIRED message 546 with cause "user inactivity" to the Primary eNB 520.

In response the Primary gNB 520 decides to release the user based on the secondary eNB "user inactivity" cause 526.

Figure 6:
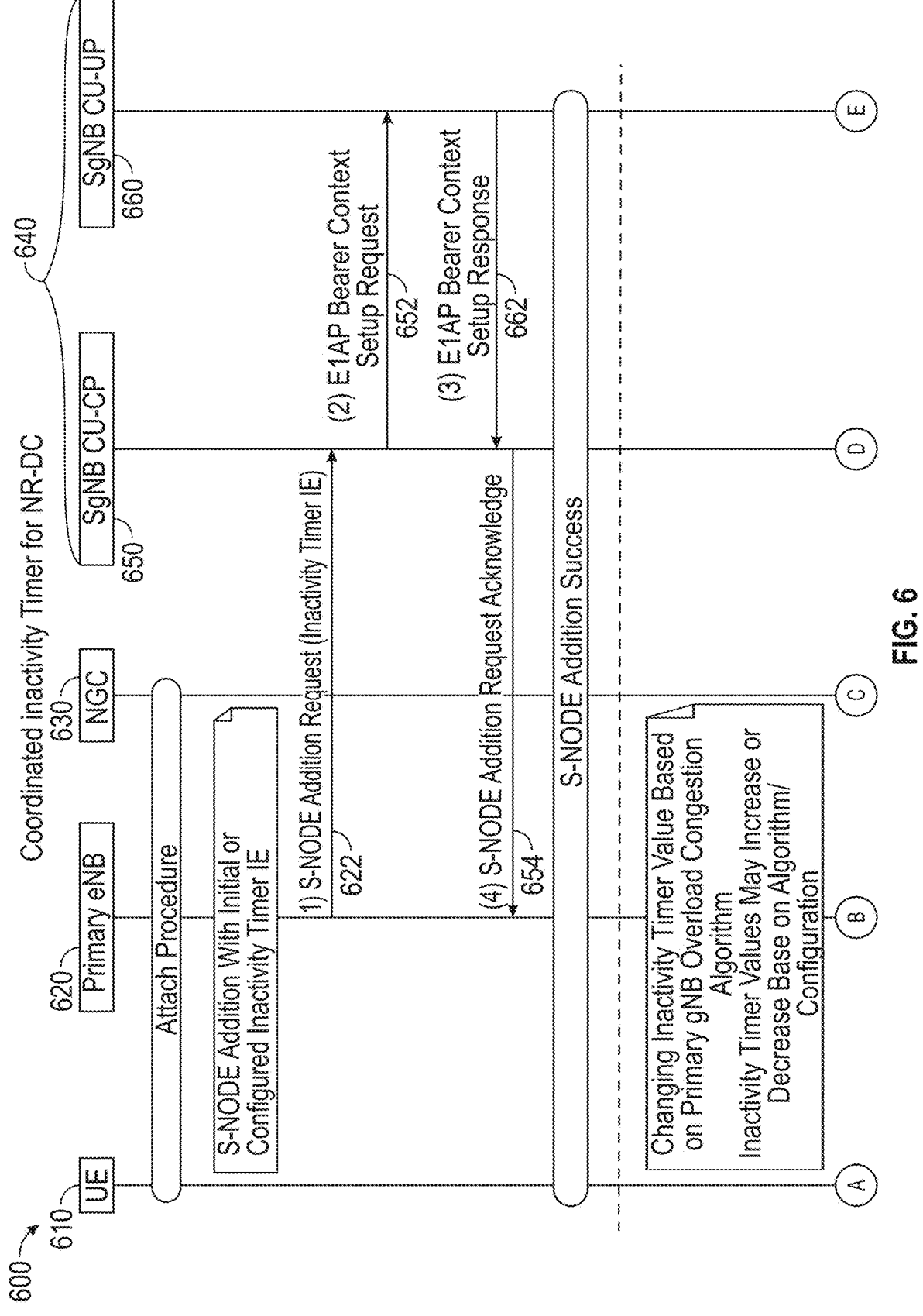
FIG. 6 illustrates NR-DC user call flow for providing Coordinated UE Inactivity Timer according to at least one embodiment.

FIG. 6 illustrates NR-DC user call flow 600 for providing Coordinated UE Inactivity Timer according to at least one embodiment.

In FIG. 6, a UE 610 connects with a Primary gNB 620 via Next Generation Core (NGC) 630. Primary gNB 620 established NR-DC with a Secondary gNB 640. Secondary gNB 640 includes Central Unit-Control Plane (CU-CP) 650 and Central Unit-User Plane (CU-UP) 660.

Primary gNB 620 configures Initial UE Inactivity Timer IE in an S-NODE ADDITION REQUEST message 622 for NR-DC users that is communicated to the Secondary gNB (SgNB) 640 over an Xn interface.

At the Secondary gNB 640, the CU-CP 650 configures the received UE Inactivity Timer values received from the Primary gNB 620 via E1AP BEARER CONTEXT SETUP REQUEST message 652 communicated to the CU-UP 660 of the Secondary gNB 640.

The SgNB CU-UP 660 applies the received UE Inactivity Timer values to monitor the user data detection from the S-GW.

After applying the UE Inactivity Timer values, the SgNB CU-UP 660 sends an E1AP BEARER CONTEXT SETUP RESPONSE message 662 to the SgNB CU-CP 650. The SgNB CU-CP 650 sends an S-NODE ADDITION REQUEST ACKNOWLEDGE message 654 to the Primary gNB 620.

The Primary gNB 620 is able to change the value of the Inactivity Timer at the Primary gNB 620 based on a congestion algorithm of the Primary gNB 620. The Primary gNB 620 is able to increase or decrease the value of the Inactivity Timer at the Primary gNB 620 based on the congestion algorithm and configuration settings.

The Primary gNB 620 dynamically configures a modified value of the Inactivity Timer and sends an S-NODE MODIFICATION REQUEST message 624 to the SgNB 640 for existing NR-DC users.

The SgNB CU-CP 650 configures the received modified value of the Inactivity Timer received from the Primary gNB 620 via an E1AP BEARER CONTEXT MODIFICATION REQUEST message 656 communicated to the SgNB CU-UP 660.

The SgNB CU-UP 660 applies the newly received modified value of the Inactivity Timer to monitor the user data detection from S-GW. The SgNB CU-UP 660 sends an E1AP BEARER CONTEXT MODIFICATION ACKNOWLEDGE message 664 to the SgNB CU-CP 650.

The SgNB CU-CP 650 sends an S-NODE MODIFICATION REQUEST ACKNOWLEDGE message 657 to the Primary gNB 620.

The SgNB CU-UP 660 monitors the UE data inactivity based on the newly received modified value of the Inactivity Timer values and sends an E1AP BEARER CONTEXT INACTIVITY NOTIFICATION message 666 to the SgNB CU-CP 650.

The SgNB CU-CP 650 sends an S-NODE INACTIVITY NOTIFICATION message 658 to the Primary gNB 620. In response, the Primary gNB 620 decides to release the UE or to move the UE to an INACTIVE state 626 based on the S-NODE INACTIVITY NOTIFICATION message 658.

Figure 7:
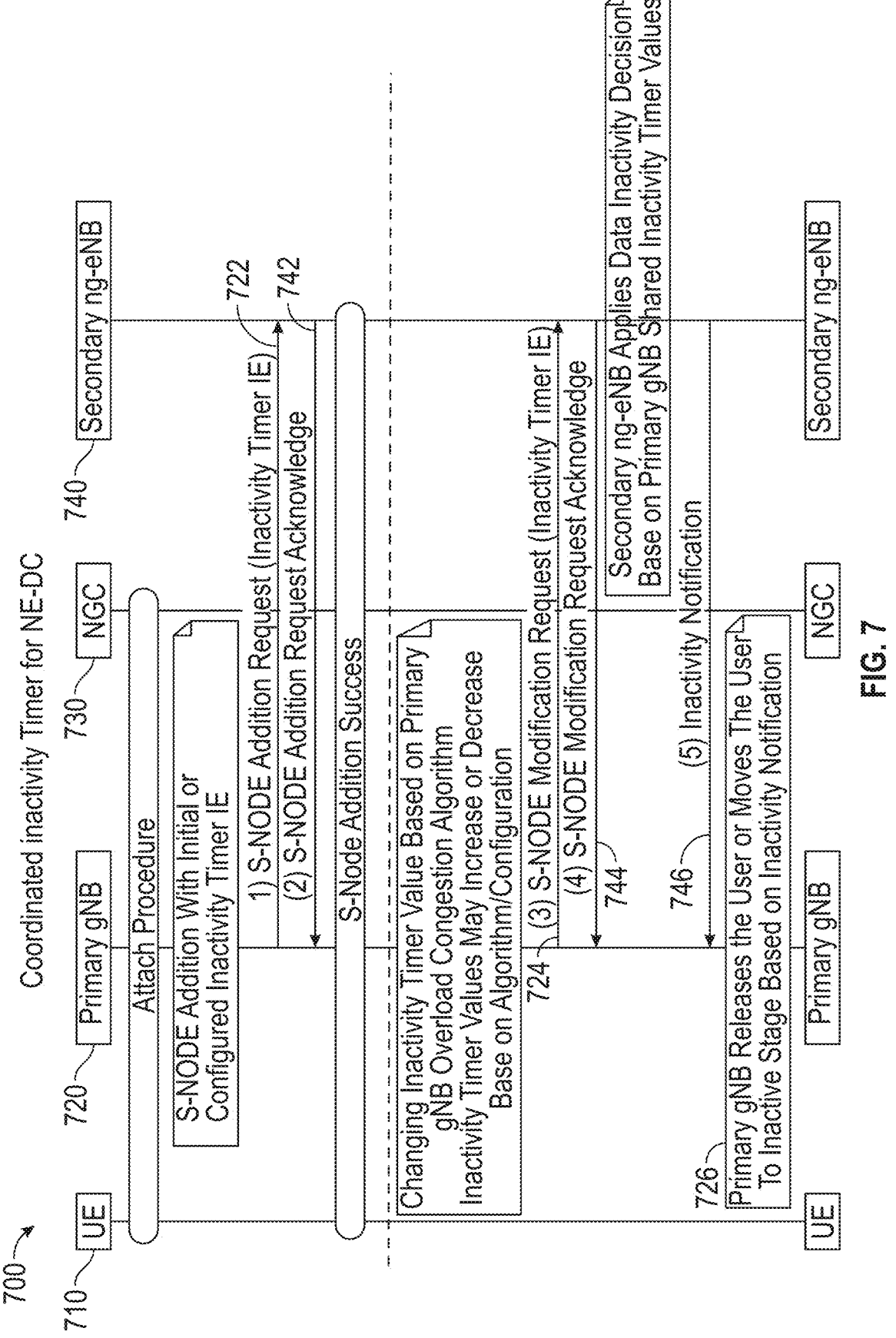
FIG. 7 illustrates NE-DC user call flow for providing Coordinated UE Inactivity Timer according to at least one embodiment.

FIG. 7 illustrates NE-DC user call flow 700 for providing Coordinated UE Inactivity Timer according to at least one embodiment.

In FIG. 7, a UE 710 connects with a Primary gNB 720 via NGC 730. Primary gNB 720 established NE-DC with Secondary Next Generation Evolved NodeB (ng-eNB) 740. Primary gNB 720 configures the Initial UE Inactivity Timer IE in an S-NODE ADDITION REQUEST message 722 for NE-DC users that is communicated to the Secondary ng-eNB 740 over an Xn interface.

The Secondary ng-eNB 740 configures the received UE Inactivity Timer values received from Primary gNB 720 to a GTP-U layer.

The GTP-U layer in the Secondary ng-eNB 740 applies the received UE Inactivity Timer values to monitor the user data detection from S-GW.

After Applying the UE Inactivity Timer values, the Secondary ng-eNB 740 sends an S-NODE ADDITION REQUEST ACKNOWLEDGE message 742 to the Primary gNB 720.

The Primary gNB 720 is able to change the value of the Inactivity Timer at the Primary gNB 720 based on a congestion algorithm of the Primary gNB 720. The Primary gNB 720 is able to increase or decrease the value of the Inactivity Timer at the Primary gNB 720 based on the congestion algorithm and configuration settings.

The Primary gNB 720 dynamically configures a modified value of the Inactivity Timer and sends the modified value of the Inactivity Timer to the Secondary ng-eNB 740 in an S-NODE MODIFICATION REQUEST message 724 for existing NE-DC users.

The Secondary ng-eNB 740 configures the received modified value of the Inactivity Timer from the Primary gNB 720 at the GTP-U layer.

The Secondary ng-eNB 740 sends an S-NODE MODIFICATION REQUEST ACKNOWLEDGE message 744 to Primary gNB 720.

The Secondary ng-eNB 740 monitors the UE data inactivity based on the newly received modified value of the Inactivity Timer and sends an INACTIVITY NOTIFICATION message 746 to the Primary gNB 720. In response, the Primary gNB decides to release the UE or to move the UE to an INACTIVE state 726.

FIG. 8 is a flow chart 800 of a method for providing coordinated inactivity timer for dual connectivity according to at least one embodiment.

In FIG. 8, the method starts S802 and a Primary Node and a Secondary Node are established operating in a dual connectivity (DC) configuration S810. Referring to FIG. 1, User Equipment (UE) is connected to two Nodes. One Node is called the Master Node (MN) and the other Node is called the Secondary Node (SN). Referring to FIG. 2A, an Evolved-Universal Terrestrial Radio Access (E-UTRA) New Radio (NR)-Dual Connectivity (EN-DC) configuration is established using a Primary evolved NodeB (eNB) and a Secondary next generation NodeB (gNB). Referring to FIG. 2B, an E-UTRA Dual Connectivity (EUTRA-DC) configuration is established using the Primary eNB and a Secondary eNB. Referring to FIG. 2C, a New Radio Dual Connectivity (NR-DC) configuration is established using a Primary gNB and the Secondary gNB. Referring to FIG. 2D, a NR-E-UTRA Dual Connectivity (NE-DC) configuration is established using the Primary gNB and a Secondary next generation evolved NodeB (ng-eNB).

A Primary Node configures an initial Inactivity Timer Value of the Primary Node to the Secondary Node for a DC user as part of DC Addition Request message S814. Referring to FIG. 3, a Primary Node 310 and Secondary Node 320 are configured with separate Inactivity Timer values to detect user inactivity.

The Primary Node periodically evaluates resource congestion for the Primary Node S818. Referring to FIG. 3, the Primary Node periodically evaluates resource congestion and when resource congestion occurs at the Primary Node.

The Primary Node determines resource congestion is occurring at the Primary Node S822. Referring to FIG. 4, Primary eNB 420 is able to increase or decrease the value of the Inactivity Timer at the Primary eNB 420 based on the congestion algorithm and configuration settings. Resource congestion is determined to be occurring at the Primary eNB 420 based on one or more of a number of RRC connected users, UE resource congestion, or signaling load in the Primary Node.

The Primary Node derives a New Inactivity Timer Value for the Primary Node S826. The Primary Node derives the new Inactivity Timer value based on a congestion threshold or algorithm. Referring to FIG. 3, the Primary Node 310 monitors resource congestion and derives a New Inactivity Timer Value for the Primary Node 310. The Primary Node 310 derives the new Inactivity Timer value based on a congestion threshold or algorithm. In response to the Primary Node 310 determining congestion is occurring, the Primary Node 310 adjusts an Inactivity Timer of the Primary Node 310.

The Primary Node sends the New Inactivity Timer Value of the Primary Node to a new incoming DC user in the Addition Request message and to existing DC users in a Modification Request message S830. Referring to FIG. 3, the Primary Node 310 sends a New Inactivity Timer Value of the Primary Node 410 to a new incoming DC user in the Addition Request Message 340 and to existing DC users in a Modification Request Message 350. The value of the Inactivity Timer of the Primary Node 310 is able to be communicated to the Secondary Node 320 using an Interface, for example, X2 interface 362, 364 or an Xn interface 366, 368. However, in at least one embodiment, the value of the Inactivity Timer of the Primary Node 310 is able to be communicated to the Secondary Node 320 using a private message interface. In at least one embodiment, the value of the Inactivity Timer of the Primary Node 310 is able to be communicated to the Secondary Node 320 using other messaging interfaces between the Primary Node 310 and the Secondary Node 320. The dynamically updated inactivity timer value is able to be communicated from a Primary Node 310 to a Secondary Node 320 for new users via a SGNB ADDITION REQUEST message 342 in EN-DC 332, via a SENB ADDITION REQUEST message 344 in EUTRA-DC 334, or via S-NODE ADDITION REQUEST messages 346, 348 in NR-DC 336 or NE-DC 338, and for existing users via a SGNB MODIFICATION REQUEST message 352 in EN-DC 332, via a SENB MODIFICATION REQUEST message 354 in EUTRA-DC 334, or via S-NODE MODIFICATION REQUEST messages 356, 358 in NR-DC 336 or NE-DC 338. In at least one embodiment, the value in the Inactivity Timer IE is able to be sent to all the existing users, or to existing users based on a Subscriber Profile ID (SPID), or to existing users which belong to a particular Secondary Node 320, e.g., gNB, eNB, or ng-eNB, or the Inactivity Timer IE sent along with a Modification Request message initiated based on a non-inactivity purpose, e.g., ERAB addition, or ERAB release for applying the updated value of Inactivity Timer IE to the Secondary Node 320.

The Secondary Node detects the user inactivity based on the Inactivity Timer Value provided by the Primary Node and sends Inactivity Notification in EN-DC, NR-DC, or NE-DC, or Release Notification in EUTRA-DC to Primary Node S834. Referring to FIG. 3, Secondary Node 320 detects the user data inactivity based on the value of the inactivity timer received from Primary Node 310 and indicates the user data inactivity to Primary Node 310.

Primary Node decides to release the user or to move the user to inactive state S838. Referring to FIG. 3, Primary Node 310 decides to either release the UE or to move the UE to an inactive state based on Secondary Node 320 indicating the user data inactivity to the Primary Node 310.

The process then terminates S850.

In at least one embodiment, a method releases an inactive user or move the user to inactive state from secondary node based on primary node recommended inactivity timer in the event of primary node resource congestion in dual connectivity scenarios. Dual connectivity of User Equipment (UE) is established with a Primary Node and a Secondary Node. Whether resource congestion is occurring at the Primary Node is determined, and a value of the inactivity timer for the UE of the Primary Node is sent to the Secondary Node. The Secondary Node detects the user data inactivity based on the value of the inactivity timer received from Primary Node and indicates the user data inactivity to the Primary Node. Primary Node decides to release the UE or to move the UE to an inactive state based on the Secondary Node indicating the user data inactivity to the Primary Node.

Embodiments described herein provide a method that provides one or more advantages. For example, a Primary Node being able to share the Coordinated Inactivity Timer with a Secondary Node in a dual connectivity implementation. The Primary node is able to change the Inactivity Timer dynamically based on a threshold or algorithm, and the Coordinated Inactivity Timer helps to reduce the primary cell overload by releasing the Dual Connectivity inactive users or moving the Dual Connectivity inactive users to an inactive state after detecting cell congestion. Other new incoming users are thus provided the opportunity to attach to the Primary Node. Primary node resources are able to be utilized efficiently during Dual Connectivity establishment.

Figure 9:
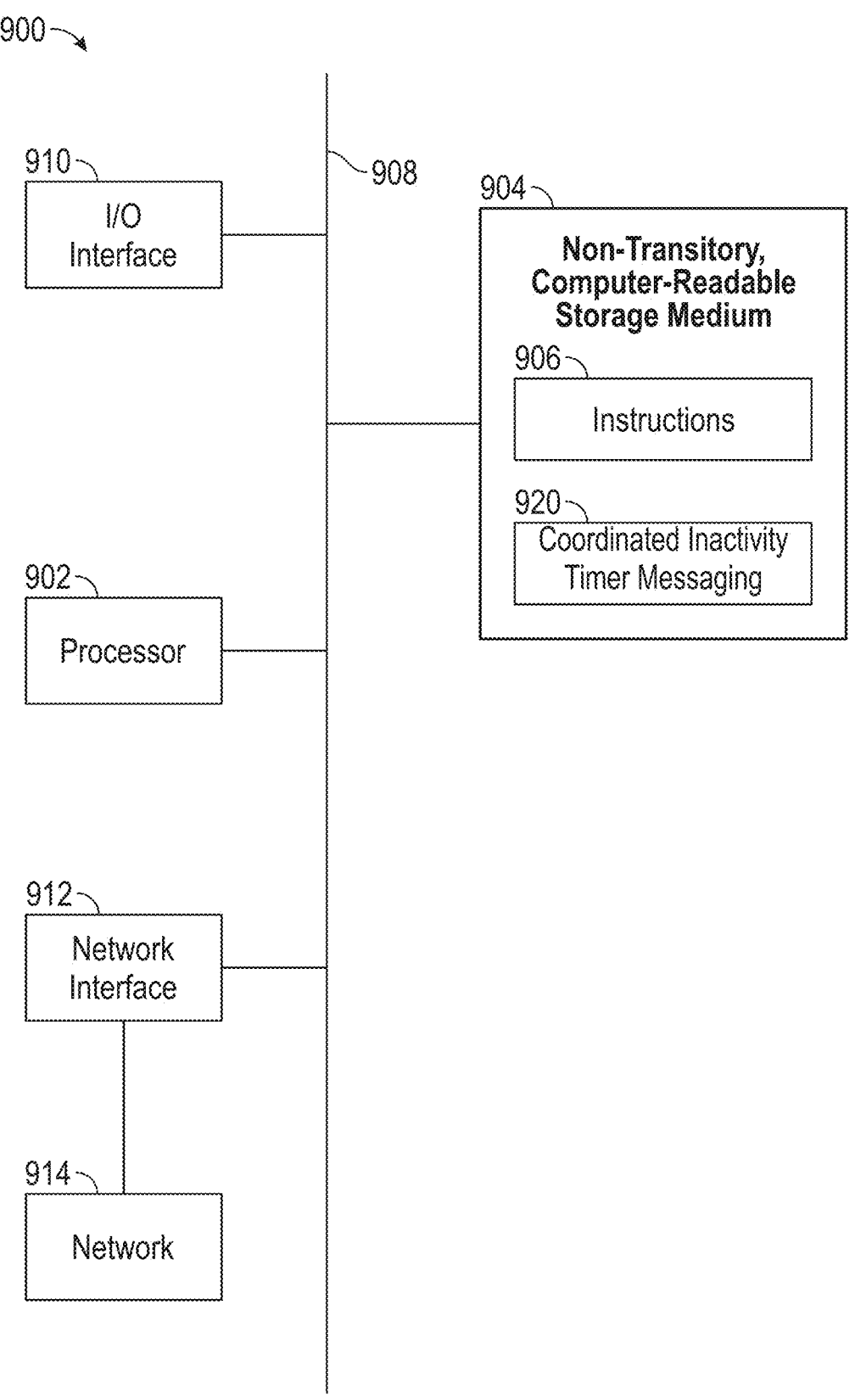
FIG. 9 is a high-level functional block diagram of a processor-based system 900 according to at least one embodiment.

FIG. 9 is a high-level functional block diagram of a processor-based system 900 according to at least one embodiment.

In at least one embodiment, processing circuitry 900 provides coordinated Inactivity Timer messaging between a Primary Node and a Secondary Node. Processing circuitry 900 implements coordinated Inactivity Timer messaging between a Primary Node and a Secondary Node using Processor 902. Processing circuitry 900 also includes a Non-Transitory, Computer-Readable Storage Medium 904 that is used to implement coordinated Inactivity Timer messaging between a Primary Node and a Secondary Node.

Non-Transitory, Computer-Readable Storage Medium 904, amongst other things, is encoded with, i.e., stores, Instructions 906, i.e., computer program code, that are executed by Processor 902 causes Processor 902 to perform operations for providing coordinated Inactivity Timer messaging between a Primary Node and a Secondary Node. Execution of Instructions 906 by Processor 902 represents (at least in part) an application which implements at least a portion of the methods described herein in accordance with one or more embodiments (hereinafter, the noted processes and/or methods).

Processor 902 is electrically coupled to Non-Transitory, Computer-Readable Storage Medium 904 via a Bus 908. Processor 902 is electrically coupled to an Input/Output (I/O) Interface 910 by Bus 908. A Network Interface 912 is also electrically connected to Processor 902 via Bus 908. Network Interface 912 is connected to a Network 914, so that Processor 902 and Non-Transitory, Computer-Readable Storage Medium 904 connect to external elements via Network 914. Processor 902 is configured to execute Instructions 906 encoded in Non-Transitory, Computer-Readable Storage Medium 904 to cause processing circuitry 900 to be usable for performing at least a portion of the processes and/or methods. In one or more embodiments, Processor 902 is a Central Processing Unit (CPU), a multi-processor, a distributed processing system, an Application Specific Integrated Circuit (ASIC), and/or a suitable processing unit.

Processing circuitry 900 includes I/O Interface 910. I/O interface 910 is coupled to external circuitry. In one or more embodiments, I/O Interface 910 includes a keyboard, keypad, mouse, trackball, trackpad, touchscreen, and/or cursor direction keys for communicating information and commands to Processor 902.

Processing circuitry 900 also includes Network Interface 912 coupled to Processor 902. Network Interface 912 allows processing circuitry 900 to communicate with Network 914, to which one or more other computer systems are connected. Network Interface 912 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 900 is configured to receive information through I/O Interface 910. The information received through I/O Interface 910 includes one or more of instructions, data, design rules, libraries of cells, and/or other parameters for processing by Processor 902. The information is transferred to Processor 902 via Bus 908. Processing circuitry 900 is configured to receive information related Coordinated Inactivity Timer Messaging 920 through I/O Interface 910.

In one or more embodiments, one or more Non-Transitory, Computer-Readable Storage Medium 904 having stored thereon Instructions 906 (in compressed or uncompressed form) that may be used to program a computer, processor, or other electronic device) to perform processes or methods described herein. The one or more Non-Transitory, Computer-Readable Storage Medium 904 include one or more of an electronic storage medium, a magnetic storage medium, an optical storage medium, a quantum storage medium, or the like.

For example, the Non-Transitory, Computer-Readable Storage Medium 904 may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more Non-Transitory Computer-Readable Storage Media 904 includes a Compact Disk-Read Only Memory (CD-ROM), a Compact Disk-Read/Write (CD-R/W), and/or a Digital Video Disc (DVD).

In one or more embodiments, Non-Transitory, Computer-Readable Storage Medium 904 stores Instructions 906 configured to cause Processor 902 to perform at least a portion of the processes and/or methods for providing coordinated Inactivity Timer messaging between a Primary Node and a Secondary Node. In one or more embodiments, Non-Transitory, Computer-Readable Storage Medium 904 also stores information, such as algorithm which facilitates performing at least a portion of the processes and/or methods for coordinated Inactivity Timer messaging between a Primary Node and a Secondary Node.

Accordingly, in at least one embodiment, Processor 902 executes Instructions 906 stored on the one or more Non-Transitory, Computer-Readable Storage Medium 904 to implement coordinated Inactivity Timer Messaging 920 between a Primary Node and a Secondary Node.

Processor 902 executes Instructions 906 stored on the one or more Non-Transitory, Computer-Readable Storage Medium 904 to establish a dual connectivity (DC) configuration for a UE, configures an initial Inactivity Timer Value of a Primary Node that is communicated to the Secondary Node, periodically evaluate resource congestion at the Primary Node, determine resource congestion is occurring at the Primary Node, derive a New Inactivity Timer Value for the Primary Node, send the New Inactivity Timer Value of the Primary Node to a new incoming DC user in an Addition Request message and to existing DC users in a Modification Request message. Processor 902 causes the Secondary Node to detect the user data inactivity based on the value of the inactivity timer provided by the Primary Node and indicates the user data inactivity to Primary Node. Processor 902 thus causes a Primary Node to release the users or to move the users to an inactive state based on the notification from Secondary Node. Processor 902 establishes one of an Evolved-Universal Terrestrial Radio Access (E-UTRA) New Radio (NR)-Dual Connectivity (EN-DC) configuration is established using a Primary evolved NodeB (eNB) and a Secondary next generation NodeB (gNB), an E-UTRA Dual Connectivity (EUTRA-DC) configuration is established using the Primary eNB and a Secondary eNB, a New Radio Dual Connectivity (NR-DC) configuration is established using a Primary gNB and the Secondary gNB, or a NR-E-UTRA Dual Connectivity (NE-DC) configuration is established using the Primary gNB and a Secondary next generation evolved NodeB (ng-eNB). The Processor increase or decrease the value of the Inactivity Timer based on the congestion algorithm and configuration settings. Processor 902 determines resource congestion is occurring based on one or more of a number of RRC connected users, UE resource congestion, or signaling load in the Primary Node. The Processor 902 sends a New Inactivity Timer Value to a new incoming DC user in an Addition Request Message and to existing DC users in a Modification Request Message. The value of the Inactivity Timer is able to be communicated to a Secondary Node by the Processor 902 using an Interface, for example, X2 interface, an Xn interface, a private message interface, or using other messaging interfaces. The Processor 902 communicates the dynamically updated inactivity timer value to a Secondary Node for new users via a SGNB ADDITION REQUEST message in EN-DC, via a SENB ADDITION REQUEST message in EUTRA-DC, or via S-NODE ADDITION REQUEST messages in NR-DC or NE-DC, and for existing users via a SGNB MODIFICATION REQUEST message in EN-DC, via a SENB MODIFICATION REQUEST message in EUTRA-DC, or via S-NODE MODIFICATION REQUEST messages in NR-DC or NE-DC. Processor 902 is able to send the Inactivity Timer IE to all the existing users, to existing users based on a Subscriber Profile ID (SPID), to existing users which belong to a particular Secondary Node, e.g., gNB, eNB, or ng-eNB, or is sent along with a Modification Request message initiated based on a non-inactivity purpose, e.g., ERAB addition or ERAB release.

In a method according to at least one embodiment, a method for providing Coordinated inactivity timer information element (IE) for dual connectivity includes establishing dual connectivity of User Equipment (UE) with a Primary Node and a Secondary Node, determining resource congestion is occurring at the Primary Node, sending, from the Primary Node to the Secondary Node, a value of an inactivity timer for the UE of the Primary Node, detecting, by the Secondary Node, user data inactivity based on the value of the inactivity timer received from Primary Node, indicating, by the Secondary Node, the user data inactivity to Primary Node, and deciding, by the Primary Node, to release the UE or to move the UE to an inactive state based on the Secondary Node indicating the user data inactivity to the Primary Node.

In a method according to at least one embodiment, the establishing the dual connectivity of the UE with the Primary Node and the Secondary Node includes establishing one of an Evolved-Universal Terrestrial Radio Access (E-UTRA) New Radio (NR)-Dual Connectivity (EN-DC) configuration using a Primary evolved NodeB (eNB) and a Secondary next generation NodeB (gNB), an E-UTRA Dual Connectivity (EUTRA-DC) configuration using the Primary eNB and a Secondary eNB, a New Radio Dual Connectivity (NR-DC) configuration using a Primary gNB and the Secondary gNB, or a NR-E-UTRA Dual Connectivity (NE-DC) configuration using the Primary gNB and a Secondary next generation evolved NodeB (ng-eNB). In a method according to at least one embodiment, the releasing the user or the moving the user to the inactive state is based on adjusting the inactivity timer in the Secondary Node according to the value of the Primary Node being provided to the Secondary Node.

In a method according to at least one embodiment, the sending, to the Secondary Node, the value of the inactivity timer for the UE of the Primary Node includes sending the value of the inactivity timer for the UE of the Primary Node through an interface that includes a private message interface for EN-DC, EUTRA-DC, NR-DC, or NE-DC, an X2 interface for EUTRA-DC or EN-DC, or an Xn interface for NR-DC or NE-DC.

In a method according to at least one embodiment, the sending, to the Secondary Node, a value of the inactivity timer for the UE of the Primary Node includes sending the Secondary Node one or more of an SGNB Addition Request message having the value of the inactivity timer of the Primary Node or an SGNB Modification Request message having the value of the inactivity timer of the Primary Node on an X2 interface between the Primary Node and the Secondary Node, wherein the Primary Node is a first eNB and the Secondary Node is a first gNB, an S-Node Addition Request message having the value of the inactivity timer of the Primary Node or an S-Node Modification Request message having the value of the inactivity timer of the Primary Node on an Xn interface between the Primary Node and the Secondary Node, wherein the Primary Node is a second gNB and the Secondary Node is one of the first gNB or a ng-eNB, or an SENB Addition Request message having the value of the inactivity timer of the Primary Node or an SENB Modification Request message having the value of the inactivity timer of the Primary Node on the X2 interface between the Primary Node and the Secondary Node, wherein the Primary Node is the first eNB and the Secondary Node is a second eNB.

In a method according to at least one embodiment, the determining the resource congestion is occurring at the Primary Node includes determining the resource congestion at the Primary Node based on one or more of a number of RRC connected users, UE resource congestion, or signaling load in the Primary Node.

In a method according to at least one embodiment, the sending, to the Secondary Node, the value of the inactivity timer for the UE of the Primary Node includes sending an inactivity timer Information Element (IE) of the Primary Node to all existing users, sending the inactivity timer IE to existing users based on a Subscriber Profile Identifier (SPID), sending the inactivity timer IE to existing users belonging to a particular secondary node, or sending the inactivity timer IE in a Modification Request message initiated based on a non-inactivity purpose.

In at least one embodiment, a node in a dual connectivity mode includes a memory storing computer-readable instructions, and a processor connected to the memory, wherein the processor is configured to execute the computer-readable instructions to establish dual connectivity of User Equipment (UE) with a Primary Node and a Secondary Node, determine resource congestion is occurring at the Primary Node, send, from the Primary Node to the Secondary Node, a value of an inactivity timer for the UE of the Primary Node, detect, by the Secondary Node, user data inactivity based on the value of the inactivity timer received from Primary Node, indicate, by the Secondary Node, the user data inactivity to Primary Node, and decide, by the Primary Node, to release the UE or to move the UE to an inactive state based on the Secondary Node indicating the user data inactivity to the Primary Node.

In a node according to at least one embodiment, the processor is further configured to establish the dual connectivity of the UE with the Primary Node and the Secondary Node by establishing one of an Evolved-Universal Terrestrial Radio Access (E-UTRA) New Radio (NR)-Dual Connectivity (EN-DC) configuration using a Primary evolved NodeB (eNB) and a Secondary next generation NodeB (gNB), an E-UTRA Dual Connectivity (EUTRA-DC) configuration using the Primary eNB and a Secondary eNB, a New Radio Dual Connectivity (NR-DC) configuration using a Primary gNB and the Secondary gNB, or a NR-E-UTRA Dual Connectivity (NE-DC) configuration using the Primary gNB and a Secondary next generation evolved NodeB (ng-eNB).

In a method according to at least one embodiment, the releasing the user or the moving the user to the inactive state is based on adjusting the inactivity timer in the Secondary Node according to the value of the Primary Node being provided to the Secondary Node.

In a node according to at least one embodiment, the processor is further configured to release the user or to move the user to the inactive state based on adjusting the inactivity timer in the Secondary Node according to the value of the Primary Node being provided to the Secondary Node.

In a node according to at least one embodiment, the processor is further configured to send, to the Secondary Node, the value of the inactivity timer for the UE of the Primary Node by sending the value of the inactivity timer for the UE of the Primary Node through an interface that includes a private message interface for EN-DC, EUTRA-DC, NR-DC, or NE-DC, an X2 interface for EUTRA-DC or EN-DC, or an Xn interface for NR-DC or NE-DC.

In a node according to at least one embodiment, the processor is further configured to send, to the Secondary Node, a value of the inactivity timer for the UE of the Primary Node by sending the Secondary Node one or more of an SGNB Addition Request message having the value of the inactivity timer of the Primary Node or an SGNB Modification Request message having the value of the inactivity timer of the Primary Node on an X2 interface between the Primary Node and the Secondary Node, wherein the Primary Node is a first eNB and the Secondary Node is a first gNB, an S-Node Addition Request message having the value of the inactivity timer of the Primary Node or an S-Node Modification Request message having the value of the inactivity timer of the Primary Node on an Xn interface between the Primary Node and the Secondary Node, wherein the Primary Node is a second gNB and the Secondary Node is one of the first gNB or a ng-eNB, or an SENB Addition Request message having the value of the inactivity timer of the Primary Node or an SENB Modification Request message having the value of the inactivity timer of the Primary Node on the X2 interface between the Primary Node and the Secondary Node, wherein the Primary Node is the first eNB and the Secondary Node is a second eNB.

In a node according to at least one embodiment, the processor is further configured to determine the resource congestion is occurring at the Primary Node by determining the resource congestion at the Primary Node based on one or more of a number of RRC connected users, UE resource congestion, or signaling load in the Primary Node.

In a node according to at least one embodiment, the processor is further configured to send, to the Secondary Node, the value of the inactivity timer for the UE of the Primary Node by sending an inactivity timer Information Element (IE) of the Primary Node to all existing users, the inactivity timer IE to existing users based on a Subscriber Profile Identifier (SPID), the inactivity timer IE to existing users belonging to a particular secondary node, or the inactivity timer IE in a Modification Request message initiated based on a non-inactivity purpose.

In at least one embodiment, a non-transitory computer-readable media having computer-readable instructions stored thereon, which when executed by a processor causes the processor to perform operations for establishing dual connectivity of User Equipment (UE) with a Primary Node and a Secondary Node, determining resource congestion is occurring at the Primary Node, sending, from the Primary Node to the Secondary Node, a value of an inactivity timer for the UE of the Primary Node, detecting, by the Secondary Node, user data inactivity based on the value of the inactivity timer received from Primary Node, indicating, by the Secondary Node, the user data inactivity to the Primary Node, and deciding, by the Primary Node, to release the UE or to move the UE to an inactive state based on the Secondary Node indicating the user data inactivity to the Primary Node.

In a non-transitory computer-readable media according to at least one embodiment, the establishing the dual connectivity of the UE with the Primary Node and the Secondary Node includes establishing one of an Evolved-Universal Terrestrial Radio Access (E-UTRA) New Radio (NR)-Dual Connectivity (EN-DC) configuration using a Primary evolved NodeB (eNB) and a Secondary next generation NodeB (gNB), an E-UTRA Dual Connectivity (EUTRA-DC) configuration using the Primary eNB and a Secondary eNB, a New Radio Dual Connectivity (NR-DC) configuration using a Primary gNB and the Secondary gNB, or a NR-E-UTRA Dual Connectivity (NE-DC) configuration using the Primary gNB and a Secondary next generation evolved NodeB (ng-eNB).

In a non-transitory computer-readable media according to at least one embodiment, the releasing the user or the moving the user to the inactive state is based on adjusting the inactivity timer in the Secondary Node according to the value of the Primary Node being provided to the Secondary Node.

In a non-transitory computer-readable media according to at least one embodiment, the sending, to the Secondary Node, the value of the inactivity timer for the UE of the Primary Node includes sending the value of the inactivity timer for the UE of the Primary Node through an interface that includes a private message interface for EN-DC, EUTRA-DC, NR-DC, or NE-DC, an X2 interface for EUTRA-DC or EN-DC, or an Xn interface for NR-DC or NE-DC.

In a non-transitory computer-readable media according to at least one embodiment, the sending, to the Secondary Node, a value of the inactivity timer for the UE of the Primary Node includes sending the Secondary Node one or more of an SGNB Addition Request message having the value of the inactivity timer of the Primary Node or an SGNB Modification Request message having the value of the inactivity timer of the Primary Node on an X2 interface between the Primary Node and the Secondary Node, wherein the Primary Node is a first eNB and the Secondary Node is a first gNB, an S-Node Addition Request message having the value of the inactivity timer of the Primary Node or an S-Node Modification Request message having the value of the inactivity timer of the Primary Node on an Xn interface between the Primary Node and the Secondary Node, wherein the Primary Node is a second gNB and the Secondary Node is one of the first gNB or a ng-eNB, or an SENB Addition Request message having the value of the inactivity timer of the Primary Node or an SENB Modification Request message having the value of the inactivity timer of the Primary Node on the X2 interface between the Primary Node and the Secondary Node, wherein the Primary Node is the first eNB and the Secondary Node is a second eNB.

In a non-transitory computer-readable media according to at least one embodiment, the sending, to the Secondary Node, the value of the inactivity timer for the UE of the Primary Node includes sending an inactivity timer Information Element (IE) of the Primary Node to all existing users, sending the inactivity timer IE to existing users based on a Subscriber Profile Identifier (SPID), sending the inactivity timer IE to existing users belonging to a particular secondary node, or sending the inactivity timer IE in a Modification Request message initiated based on a non-inactivity purpose.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for providing coordinated inactivity timer information for dual connectivity, comprising:
   establishing dual connectivity of User Equipment (UE) with a Primary Node and a Secondary Node;
   determining resource congestion is occurring at the Primary Node;
   sending, from the Primary Node to the Secondary Node, a new value of an inactivity timer for the UE of the Primary Node;
   detecting, by the Secondary Node, user data inactivity based on the new value of the inactivity timer received from the Primary Node;
   indicating, by the Secondary Node, the user data inactivity to the Primary Node; and
   deciding, by the Primary Node, to release the UE or to move the UE to an inactive state based on the Secondary Node indicating the user data inactivity to the Primary Node;
   wherein the sending, from the Primary Node to the Secondary Node, the new value of the inactivity timer is in response to the determining the resource congestion is occurring at the Primary Node, and wherein the new value of the inactivity timer is sent from the Primary Node to the Secondary Node over an interface setup between the Primary Node and the Secondary Node without being relayed through the UE.

2. The method of claim 1, wherein the establishing the dual connectivity of the UE with the Primary Node and the Secondary Node includes establishing one of:
   an Evolved-Universal Terrestrial Radio Access (E-UTRA) New Radio (NR)-Dual Connectivity (EN-DC) configuration using a Primary evolved NodeB (eNB) and a Secondary next generation NodeB (gNB);
   an E-UTRA Dual Connectivity (EUTRA-DC) configuration using the Primary eNB and a Secondary eNB;
   a New Radio Dual Connectivity (NR-DC) configuration using a Primary gNB and the Secondary gNB; or
   a NR-E-UTRA Dual Connectivity (NE-DC) configuration using the Primary gNB and a Secondary next generation evolved NodeB (ng-eNB).

3. The method of claim 1, wherein the releasing the UE or the moving the UE to the inactive state is based on adjusting the inactivity timer in the Secondary Node according to the new value of the Primary Node being provided to the Secondary Node.

4. The method of claim 1, wherein the sending, to the Secondary Node, the new value of the inactivity timer for the UE of the Primary Node includes sending the new value of the inactivity timer for the UE of the Primary Node through an interface that includes a private message interface for EN-DC, EUTRA-DC, NR-DC, or NE-DC, an X2 interface for EUTRA-DC or EN-DC, or an Xn interface for NR-DC or NE-DC.

5. The method of claim 1, wherein the sending, to the Secondary Node, the value of the inactivity timer for the UE of the Primary Node includes sending the Secondary Node one or more of:
   an SGNB ADDITION REQUEST message having the new value of the inactivity timer of the Primary Node or an SGNB MODIFICATION REQUEST message having the new value of the inactivity timer of the Primary Node on an X2 interface between the Primary Node and the Secondary Node, wherein the Primary Node is a first eNB and the Secondary Node is a first gNB;
   an S-Node Addition Request message having the new value of the inactivity timer of the Primary Node or an S-Node Modification Request message having the new value of the inactivity timer of the Primary Node on an Xn interface between the Primary Node and the Secondary Node, wherein the Primary Node is a second gNB and the Secondary Node is one of the first gNB or a ng-eNB; or
   an SENB Addition Request message having the new value of the inactivity timer of the Primary Node or an SENB Modification Request message having the new value of the inactivity timer of the Primary Node on the X2 interface between the Primary Node and the Secondary Node, wherein the Primary Node is the first eNB and the Secondary Node is a second eNB.

6. The method of claim 1, wherein determining the resource congestion is occurring at the Primary Node includes determining the resource congestion at the Primary Node based on one or more of a number of RRC connected users, UE resource congestion, or signaling load in the Primary Node.

7. The method of claim 1, wherein the sending, to the Secondary Node, the new value of the inactivity timer for the UE of the Primary Node includes sending an inactivity timer Information Element (IE) of the Primary Node to existing users, sending the inactivity timer IE to the existing users based on a Subscriber Profile Identifier (SPID), sending the inactivity timer IE to the existing users belonging to a particular secondary node, or sending the inactivity timer IE in a Modification Request message initiated based on a non-inactivity purpose.

8. A node in a dual connectivity mode, configured to:
   establish dual connectivity of User Equipment (UE) with a Primary Node and a Secondary Node;
   determine resource congestion is occurring at the Primary Node;
   send, from the Primary Node to the Secondary Node, a new value of an inactivity timer for the UE of the Primary Node;
   detect, by the Secondary Node, user data inactivity based on the new value of the inactivity timer received from Primary Node;
   indicate, by the Secondary Node, the user data inactivity to the Primary Node; and
   decide, by the Primary Node, to release the UE or to move the UE to an inactive state based on the Secondary Node indicating the user data inactivity to the Primary Node;
   wherein the sending, from the Primary Node to the Secondary Node, the new value of the inactivity timer is in response to the determining the resource congestion is occurring at the Primary Node, and wherein the new value of the inactivity timer is sent from the Primary Node to the Secondary Node over an interface setup between the Primary Node and the Secondary Node without being relayed through the UE.

9. The node of claim 8, configured to establish the dual connectivity of the UE with the Primary Node and the Secondary Node by establishing one of:

an Evolved-Universal Terrestrial Radio Access (E-UTRA) New Radio (NR)-Dual Connectivity (EN-DC) configuration using a Primary evolved NodeB (eNB) and a Secondary next generation NodeB (gNB);

an E-UTRA Dual Connectivity (EUTRA-DC) configuration using the Primary eNB and a Secondary eNB;

a New Radio Dual Connectivity (NR-DC) configuration using a Primary gNB and the Secondary gNB; or a NR-E-UTRA Dual Connectivity (NE-DC) configuration using the Primary gNB and a Secondary next generation evolved NodeB (ng-eNB).

10. The node of claim 8, configured to release the UE or to move the UE to the inactive state based on adjusting the inactivity timer in the Secondary Node according to the new value of the Primary Node being provided to the Secondary Node.

11. The node of claim 8, configured to send, to the Secondary Node, the new value of the inactivity timer for the UE of the Primary Node by sending the new value of the inactivity timer for the UE of the Primary Node through an interface that includes a private message interface for EN-DC, EUTRA-DC, NR-DC, or NE-DC, an X2 interface for EUTRA-DC or EN-DC, or an Xn interface for NR-DC or NE-DC.

12. The node of claim 8, configured to send, to the Secondary Node, the new value of the inactivity timer for the UE of the Primary Node by sending the Secondary Node one or more of:

an SGNB Addition Request message having the new value of the inactivity timer of the Primary Node or an SGNB Modification Request message having the new value of the inactivity timer of the Primary Node on an X2 interface between the Primary Node and the Secondary Node, wherein the Primary Node is a first eNB and the Secondary Node is a first gNB;

an S-Node Addition Request message having the new value of the inactivity timer of the Primary Node or an S-Node Modification Request message having the new value of the inactivity timer of the Primary Node on an Xn interface between the Primary Node and the Secondary Node, wherein the Primary Node is a second gNB and the Secondary Node is one of the first gNB or a ng-eNB; or an SENB Addition Request message having the new value of the inactivity timer of the Primary Node or an SENB Modification Request message having the new value of the inactivity timer of the Primary Node on the X2 interface between the Primary Node and the Secondary Node, wherein the Primary Node is the first eNB and the Secondary Node is a second eNB.

13. The node of claim 8, configured to determine the resource congestion is occurring at the Primary Node by determining the resource congestion at the Primary Node based on one or more of a number of RRC connected users, UE resource congestion, or signaling load in the Primary Node.

14. The node of claim 8, configured to send, to the Secondary Node, the new value of the inactivity timer for the UE of the Primary Node by sending inactivity timer Information Element (IE) of the Primary Node to existing users, the inactivity timer IE to the existing users based on a Subscriber Profile Identifier (SPID), the inactivity timer IE to the existing users belonging to a particular secondary node, or the inactivity timer IE in a Modification Request message initiated based on a non-inactivity purpose.

15. A non-transitory computer-readable media having computer-readable instructions stored thereon, which when executed causes operations to be performed for:

establishing dual connectivity of User Equipment (UE) with a Primary Node and a Secondary Node;

determining resource congestion is occurring at the Primary Node;

sending, from the Primary Node to the Secondary Node, a new value of an inactivity timer for the UE of the Primary Node;

detecting, by the Secondary Node, user data inactivity based on the new value of the inactivity timer received from Primary Node;

indicating, by the Secondary Node, the user data inactivity to the Primary Node; and deciding, by the Primary Node, to release the UE or to move the UE to an inactive state based on the Secondary Node indicating the user data inactivity to the Primary Node;

wherein the sending, from the Primary Node to the Secondary Node, the new value of the inactivity timer is in response to the determining the resource congestion is occurring at the Primary Node, and wherein the new value of the inactivity timer is sent from the Primary Node to the Secondary Node over an interface setup between the Primary Node and the Secondary Node without being relayed through the UE.

16. The non-transitory computer-readable media of claim 15, wherein the establishing the dual connectivity of the UE with the Primary Node and the Secondary Node includes establishing one of:

an Evolved-Universal Terrestrial Radio Access (E-UTRA) New Radio (NR)-Dual Connectivity (EN-DC) configuration using a Primary evolved NodeB (eNB) and a Secondary next generation NodeB (gNB);

an E-UTRA Dual Connectivity (EUTRA-DC) configuration using the Primary eNB and a Secondary eNB;

a New Radio Dual Connectivity (NR-DC) configuration using a Primary gNB and the Secondary gNB; or a NR-E-UTRA Dual Connectivity (NE-DC) configuration using the Primary gNB and a Secondary next generation evolved NodeB (ng-eNB).

17. The non-transitory computer-readable media of claim 15, wherein the releasing the UE or the moving the UE to the inactive state is based on adjusting the inactivity timer in the Secondary Node according to the new value of the Primary Node being provided to the Secondary Node.

18. The non-transitory computer-readable media of claim 15, wherein the sending, to the Secondary Node, the new value of the inactivity timer for the UE of the Primary Node includes sending the new value of the inactivity timer for the UE of the Primary Node through an interface that includes a private message interface for EN-DC, EUTRA-DC, NR-DC, or NE-DC, an X2 interface for EUTRA-DC or EN-DC, or an Xn interface for NR-DC or NE-DC.

19. The non-transitory computer-readable media of claim 15, wherein the sending, to the Secondary Node, the new value of the inactivity timer for the UE of the Primary Node includes sending the Secondary Node one or more of:

an SGNB Addition Request message having the new value of the inactivity timer of the Primary Node or an SGNB Modification Request message having the new value of the inactivity timer of the Primary Node on an X2 interface between the Primary Node and the Secondary Node, wherein the Primary Node is a first eNB and the Secondary Node is a first gNB;

an S-Node Addition Request message having the new value of the inactivity timer of the Primary Node or an S-Node Modification Request message having the new value of the inactivity timer of the Primary Node on an Xn interface between the Primary Node and the Secondary Node, wherein the Primary Node is a second gNB and the Secondary Node is one of the first gNB or a ng-eNB; or an SENB Addition Request message having the new value of the inactivity timer of the Primary Node or an SENB Modification Request message having the new value of the inactivity timer of the Primary Node on the X2 interface between the Primary Node and the Secondary Node, wherein the Primary Node is the first eNB and the Secondary Node is a second eNB.

20. The non-transitory computer-readable media of claim 15, wherein the sending, to the Secondary Node, the new value of the inactivity timer for the UE of the Primary Node includes sending an inactivity timer Information Element (IE) of the Primary Node to existing users, sending the inactivity timer IE to the existing users based on a Subscriber Profile Identifier (SPID), sending the inactivity timer IE to the existing users belonging to a particular secondary node, or sending the inactivity timer IE in a Modification Request message initiated based on a non-inactivity purpose.

\* \* \* \* \*